(12) United States Patent
Kim et al.

(10) Patent No.: US 8,500,331 B2
(45) Date of Patent: Aug. 6, 2013

(54) HYBRID AIR FOIL BEARING AND METHOD OF MANUFACTURE

(75) Inventors: Daejong Kim, Arlington, TX (US); An Sung Lee, Daejon (KR); Young-Cheol Kim, Daejon (KR)

(73) Assignees: Board of Regents, The University of Texas System, Austin, TX (US); Korea Institute of Machinery and Materials, Daejeon (KR)

( * ) Notice: Subject to any disclaimer, the term of this patent is extended or adjusted under 35 U.S.C. 154(b) by 724 days.

(21) Appl. No.: 12/694,262

(22) Filed: Jan. 26, 2010

(65) Prior Publication Data

US 2011/0033142 A1     Feb. 10, 2011

Related U.S. Application Data

(60) Provisional application No. 61/147,431, filed on Jan. 26, 2009.

(51) Int. Cl.
*F16C 32/06* (2006.01)
*F16C 27/02* (2006.01)

(52) U.S. Cl.
USPC ......... 384/106; 384/103; 384/104; 29/898.02

(58) Field of Classification Search
USPC ................. 384/103, 105, 106, 104; 29/898.02
See application file for complete search history.

(56) References Cited

U.S. PATENT DOCUMENTS

| | | | | |
|---|---|---|---|---|
| 1,930,285 A | * | 10/1933 | Robinson | 138/143 |
| 4,213,657 A | * | 7/1980 | Gray | 384/105 |
| 4,865,466 A | * | 9/1989 | Jones | 384/106 |
| 5,827,040 A | | 10/1998 | Bosley et al. | |
| 6,582,125 B1 | | 6/2003 | Kim et al. | |
| 6,698,930 B2 | * | 3/2004 | Akizuki et al. | 384/106 |
| 6,893,733 B2 | * | 5/2005 | Obeshaw | 428/593 |
| 2002/0097927 A1 | | 7/2002 | Lee et al. | |
| 2007/0003693 A1 | | 1/2007 | Lee et al. | |
| 2008/0057223 A1 | | 3/2008 | Lee et al. | |

FOREIGN PATENT DOCUMENTS

EP          521302 A2  *  1/1993
JP     2002286558 A  * 10/2002

OTHER PUBLICATIONS

Park, S., "Hybrid Air Foil Bearings with External Pressurization," (May 2007) Master of Science Thesis, Texas A&M University.

(Continued)

*Primary Examiner* — Marcus Charles
(74) *Attorney, Agent, or Firm* — Daniel J. Chalker; Chalker Flores, LLP

(57) ABSTRACT

An air foil bearing includes a top foil, one or more orifice tubes and two or more bump foil strips disposed within a housing. The top foil is forms a substantially circular shape having one or more sets of top foil orifice holes. Each set of top foil orifice holes has at least three top foil orifice holes along a circumference of the top foil. An orifice tube is provided for each set of top foil orifice holes. The orifice tube includes a flat side having a set of tube orifice holes connected to an outer surface of the top foil. The bump foil strip is attached to the outer surface of the top foil adjacent to each side of each orifice tube. Another embodiment uses a housing with an inner surface having a curved polygonal cross-sectional shape with an odd number of curved sides.

38 Claims, 26 Drawing Sheets

OTHER PUBLICATIONS

Lubell, D., et al., "Test Evolution and Oil-Free Engine Experience of a High Temperature Foil Air Bearing Coating," (2006) Proceedings of the ASME Turbo Expo 2006, Power for Land, Sea and Air, Barcelona, Spain, May 8-11, ASME Paper No. GT2006-90572.

Curwen, P.W., et al., "High-Performance Turboalternator and Associated Hardware I—Design of Gas Bearings," Mar. 1969, NASA Report No. NASA-CR-1291.

Dellacorte, C., et al., "Preliminary Evaluation of PS300: A New Self-Lubricating High Temperature Composite Coating for us to 800 C," Jan. 1996, NASA Technical Report, NASA, Cleveland, OH, NASA TM-107056.

Dellacorte, C., et al., "Performance and Durability of High Temperature Foil Air Bearings for Oil-Free Turbomachinery," Mar. 2000, NASA Technical Report, TM-2000-209187/ARL-TR-2202.

Eshel, A., "Numerical Solution of the Planar Hydrostatic Foil Bearing," Jan. 1979, ASME Journal of Lubrication Technology, 101:86-91.

Han, D.C., et al., "A Study on the Characteristics of Externally Pressurized Gas Bearings," Jul. 1994, Precision Engineering 16(3):164-173.

Heshmat, H., et al., "On the Performance of Hybrid Foil-Magnetic Bearings," Jan. 2000, Journal of Engineering for Gas Turbine and Power, 122(1):73.

Heshmat, H., "Evaluation of Coatings for a Large Hybrid Foil/Magnetic Bearing," Oct. 2006, International Joint Tribology Conference, San Antonio, TX, ASME Paper No. IJTC2006-12328.

Kim, D., et al., "Hybrid Air Foil Bearings with External Pressurization," ASME International Mechanical Engineering Congress and Exposition, Nov. 2006, ASME Paper IMECE2006-16151.

Kim, D., "Parametric Studies on Static and Dynamic Performance of Air Foil Bearings with Different Top Foil geometries and Bump Stiffness Distributions," Apr. 2007, Journal of Tribology 129:354-364.

Kim, D., 4 et al., "Hydrostatic Air Foil Bearings: Analytical and Experimental Investigation," Aug. 5, 2008, Tribology International 42:413-425.

Kim, D., et al., "Design and Manufacturing of Meso Scale Tilting Pad Gas Bearings for 100-200W Class PowerMEMS Applications," Jul. 2009, Journal of Engineering for Gas Turbines and Power, 131(3): 042503.1-042503.11.

Kumar, M., et al., "Parametric Studies on Dynamic Performance of Hybrid Air Foil Bearings," Nov. 2008, Journal of Engineering for Gas Turbines and Power 130:062501-1-0625801-7.

Kumar, M., et al., "Static Performance of Hydrostatic Air Bump Foil Bearing," Oct. 2009, Elsevier Tribology International, doi:10.1016/j.triboint.2009.10.015.

Lund, J.W., "The Hydrostatic Gas Journal Bearing with Journal Rotation and Vibration," Jun. 1964, ASME J. of Basic Engineering 86:328-336.

Lund, J.W., "A Theoretical Analysis of Whirl Instability of Pneumatic Hammer for a Rigid Rotor in Pressurized Gas Journal Bearings," Journal of Lubrication Technology, Apr. 1967, 89:154-166.

Mohawk Innovative Technology, "Low-Friction, Wear-Resistant KorolonTM C36 Coatings for High-Temperature, High-Speed, Air Foil Bearings," Mohawk Innovative Technology Internal Newsletter, May 2005, vol. 23.

Mori, H., al., "Theoretical Flow-Models for Externally Pressurized Gas Bearings," ASME J. Lubr. Technol., Jan. 1969, 91:183-193.

Osborne, D.A., et al., "Experimental Response of Simple Gas Hybrid Bearings for Oil-Free Turbomachinery," Journal of Engineering for Gas Turbines and Power, Jul. 2006, 128:626-633.

Rimpel, A.M., et al., "Rotordynamic Performance of Flexure Pivot Tilting Pad Gas Bearings with Vibration Damper," ASME Journal of Tribology, Apr. 2009, 131(2):021101.1-021101.12.

San Andres, L., "Hybrid Flexure Pivot-Tilting Pad Gas Bearings: Analysis and Experimental Validation," Journal of Tribology, Jul. 2006, 128:551-558.

Sim, K., et al., "Design of Flexure Pivot Tilting Pads Gas Bearings for High-Speed Oil-Free Microturbomachinery," Journal of Tribology, Jan. 2007, 129:112-119.

Song, J., et al., "Foil Gas Bearing with Compression Springs: Analyses and Experiments," Journal of Tribology, Jul. 2007, 129:628-639.

Stanford, M.K., et al., "Thermal Effects on Low Cr Modification of PS304 Solid Lubricant Coating," Jun. 2004, NASA technical Report, NASA, Cleveland, OH, NASA TM-2003-213111.

Swanson, E.E., et al., "Oil-Free Foil Bearings as a Reliable, High Performance Backup Bearing for Active Magnetic Bearings," ASME Turbo Expo 2002: Power for Land, Sea, and Air, Jun. 2002, Amsterdam, The Netherlands, Jun. 3-6, GT2002-30291.

Swanson, E.E., et al., "Performance of a Foil-Magnetic Hybrid Bearing," Journal of Engineering for Gas Turbine and Power, Apr. 2002, 124(2):375-382.

Zhu, X., et al., "Rotordynamic Performance of Flexure Pivot Hydrostatic Gas Bearings for Oil-Free Turbomachinery," ASME Turbo Expo 2004, Vienna, Austria, Jun. 2004, ASME Paper No. GT2004-53621.

* cited by examiner

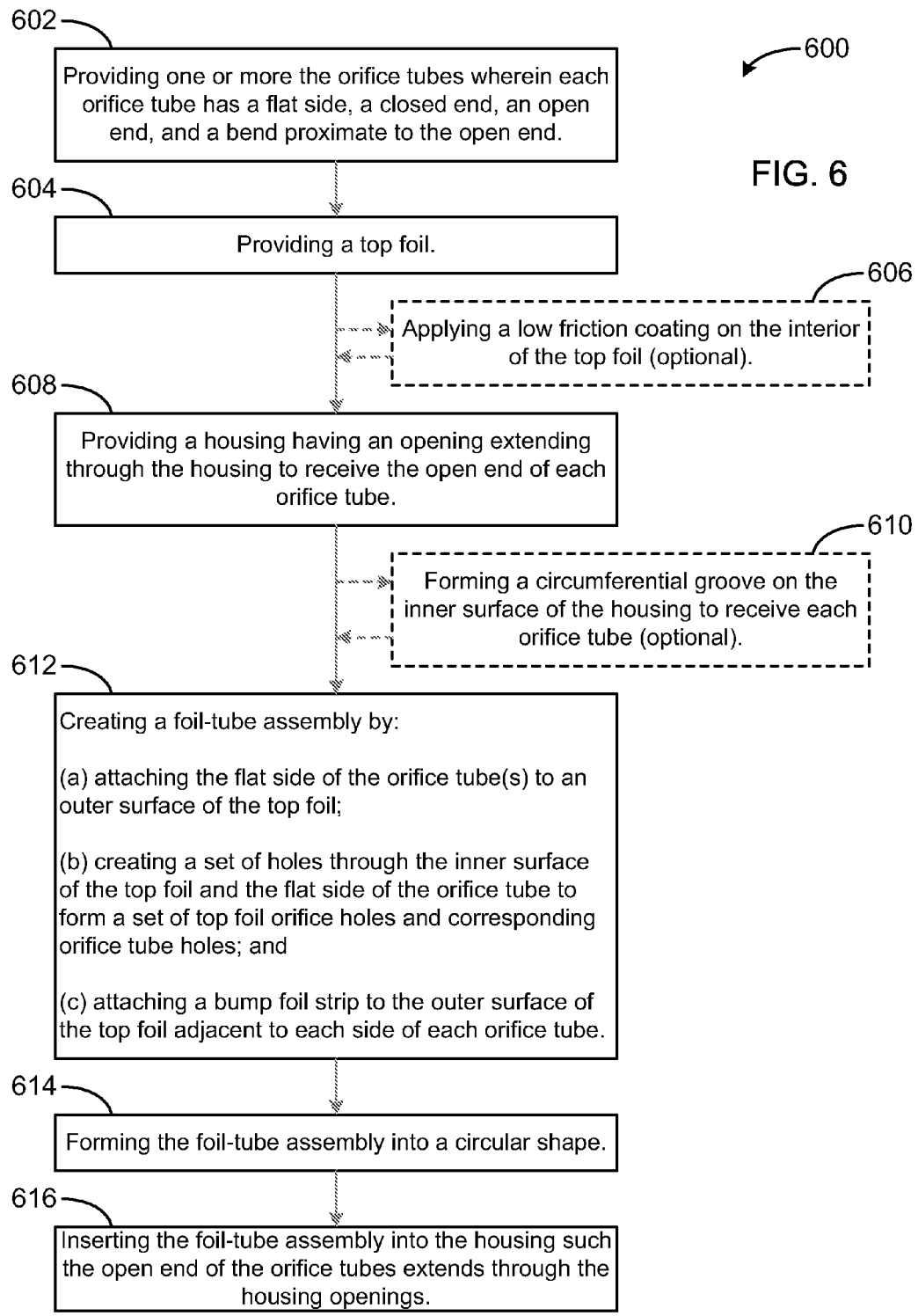

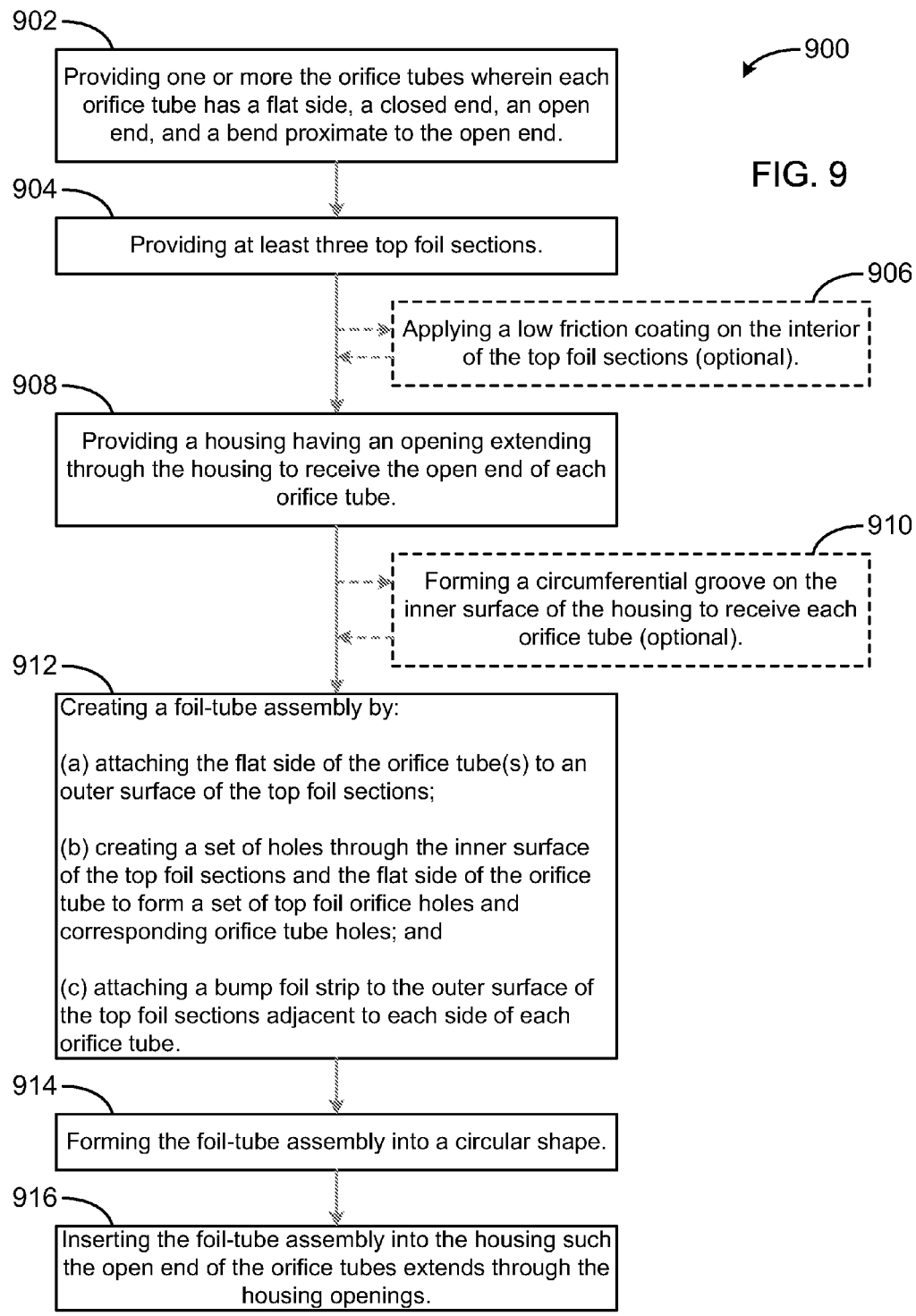

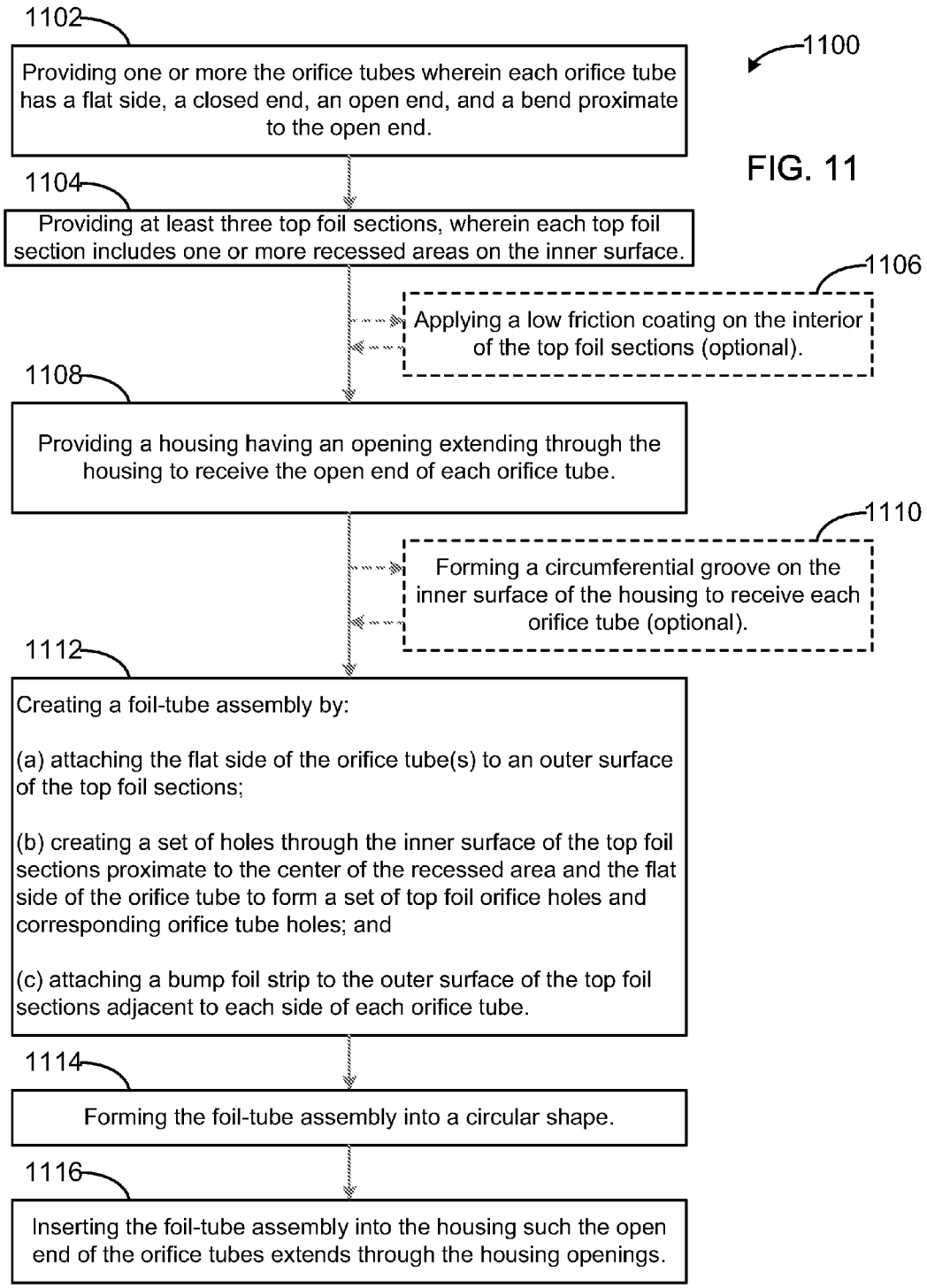

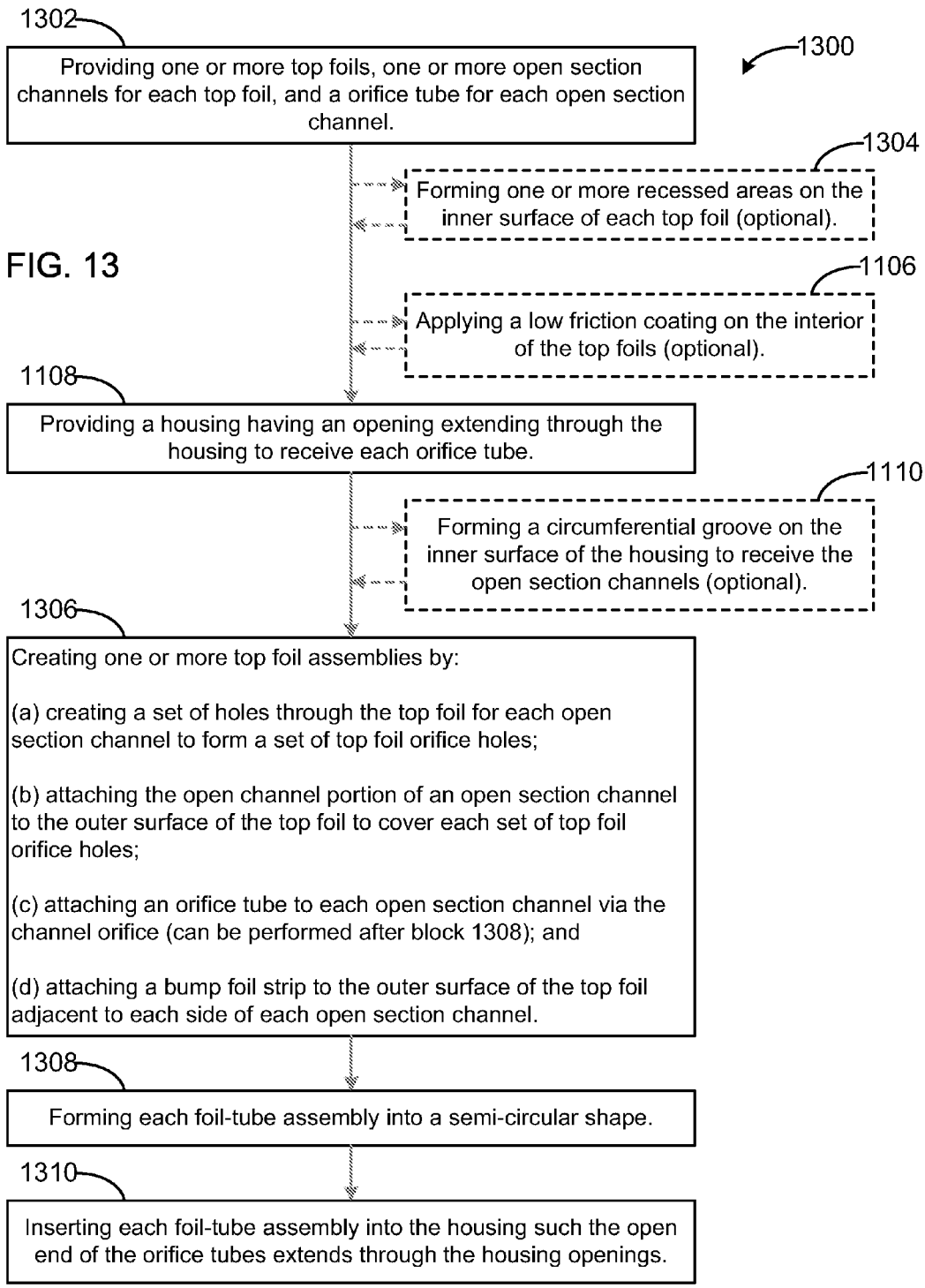

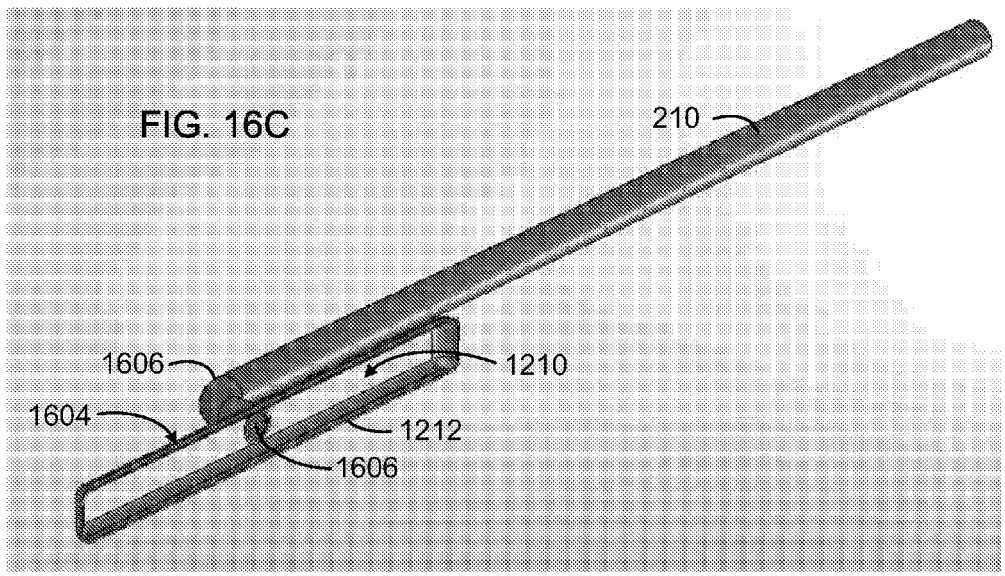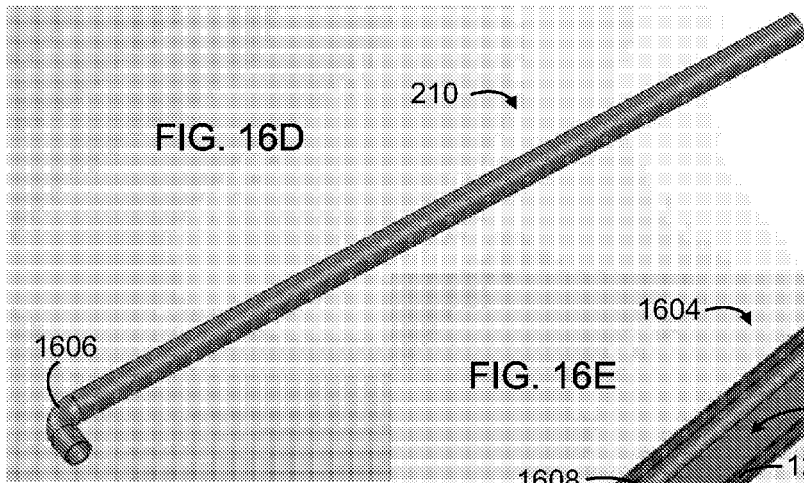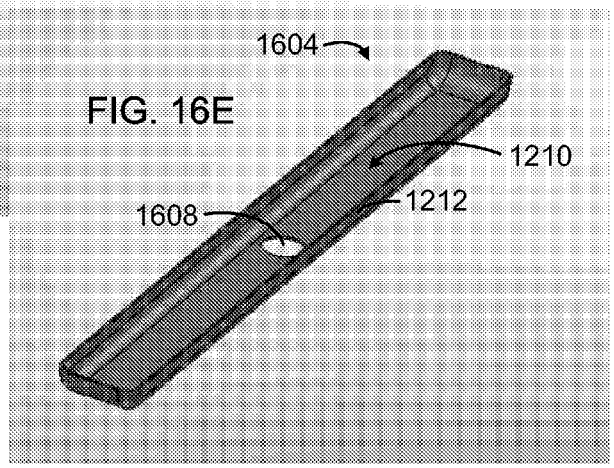

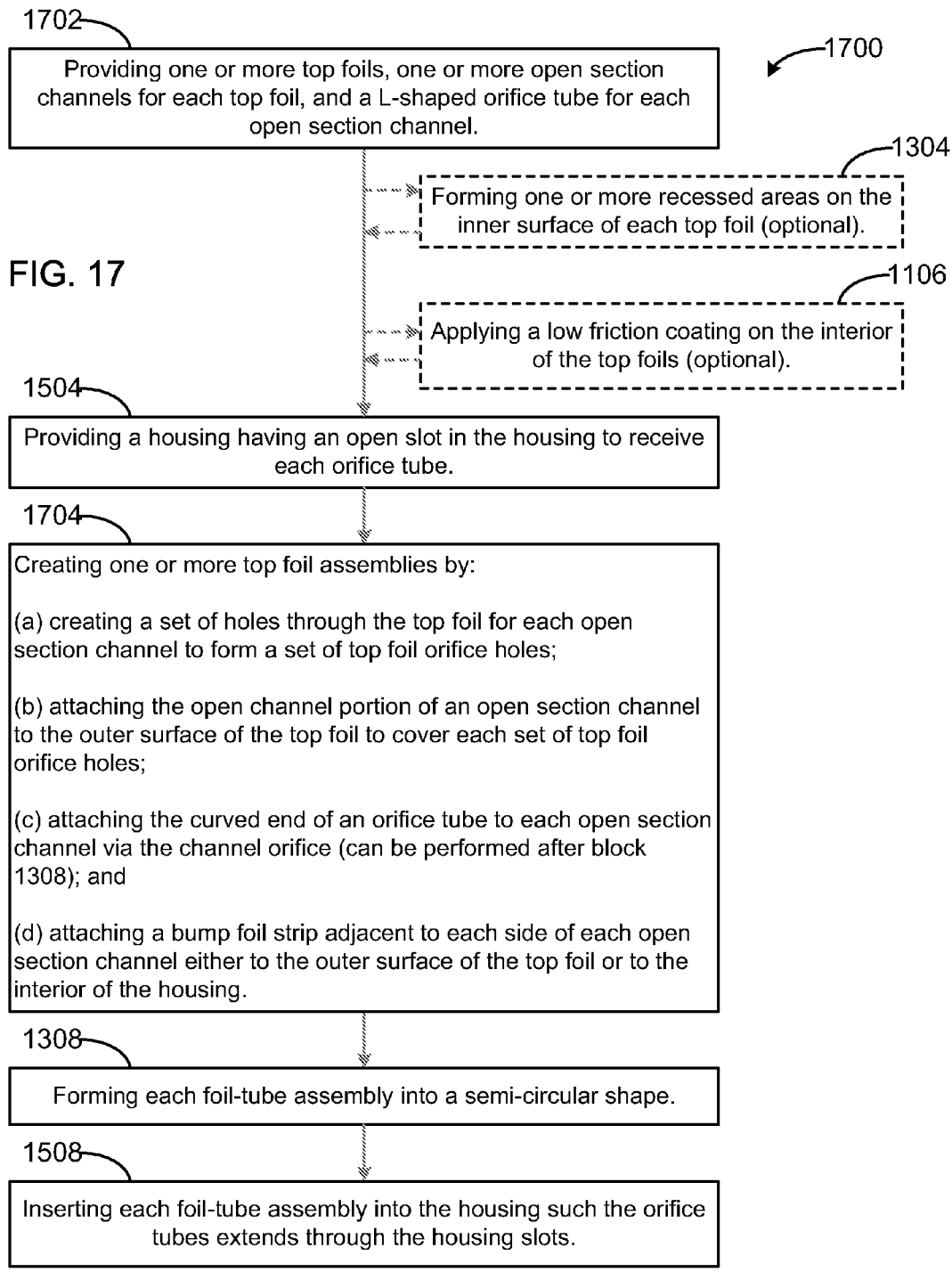

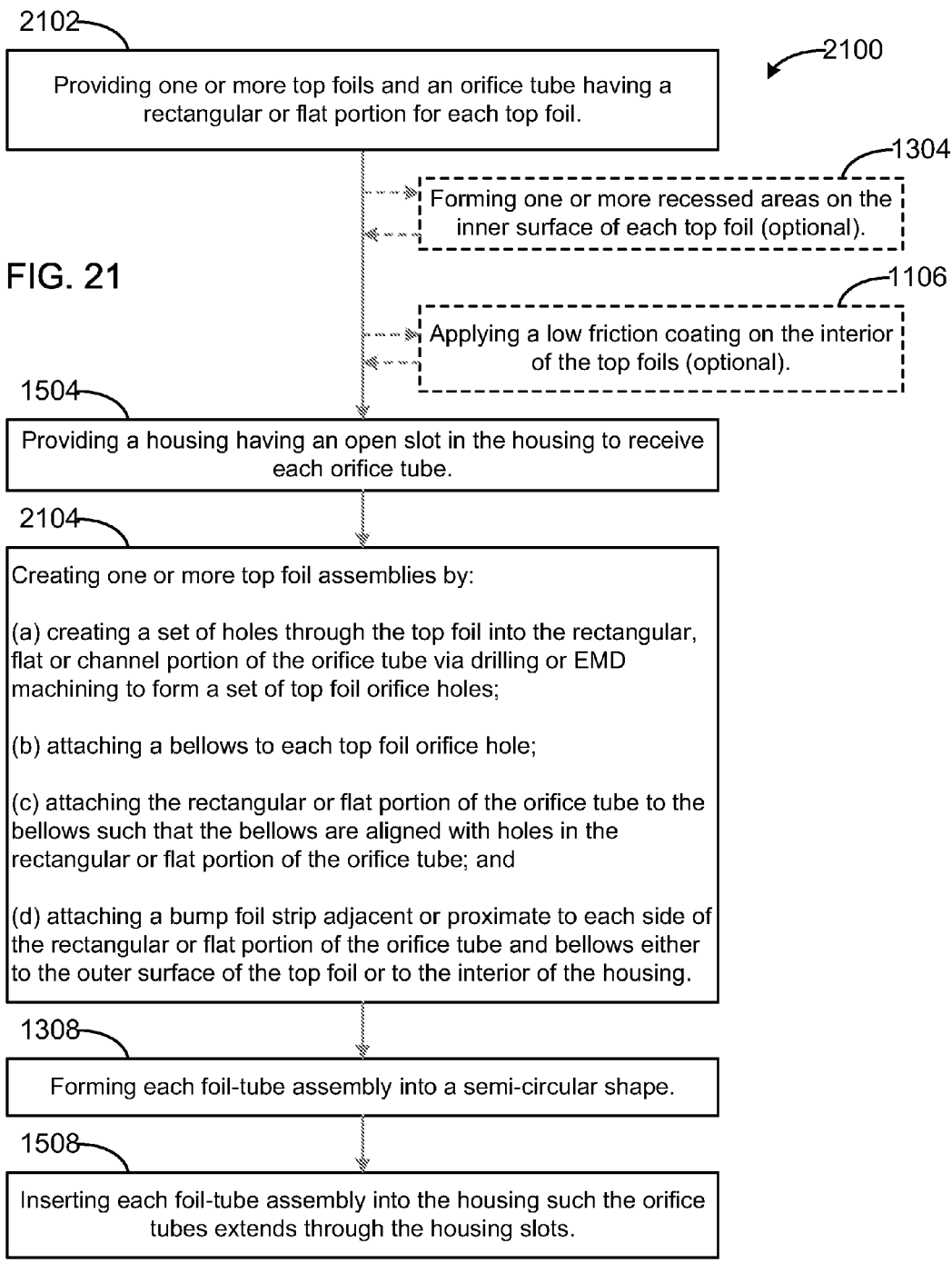

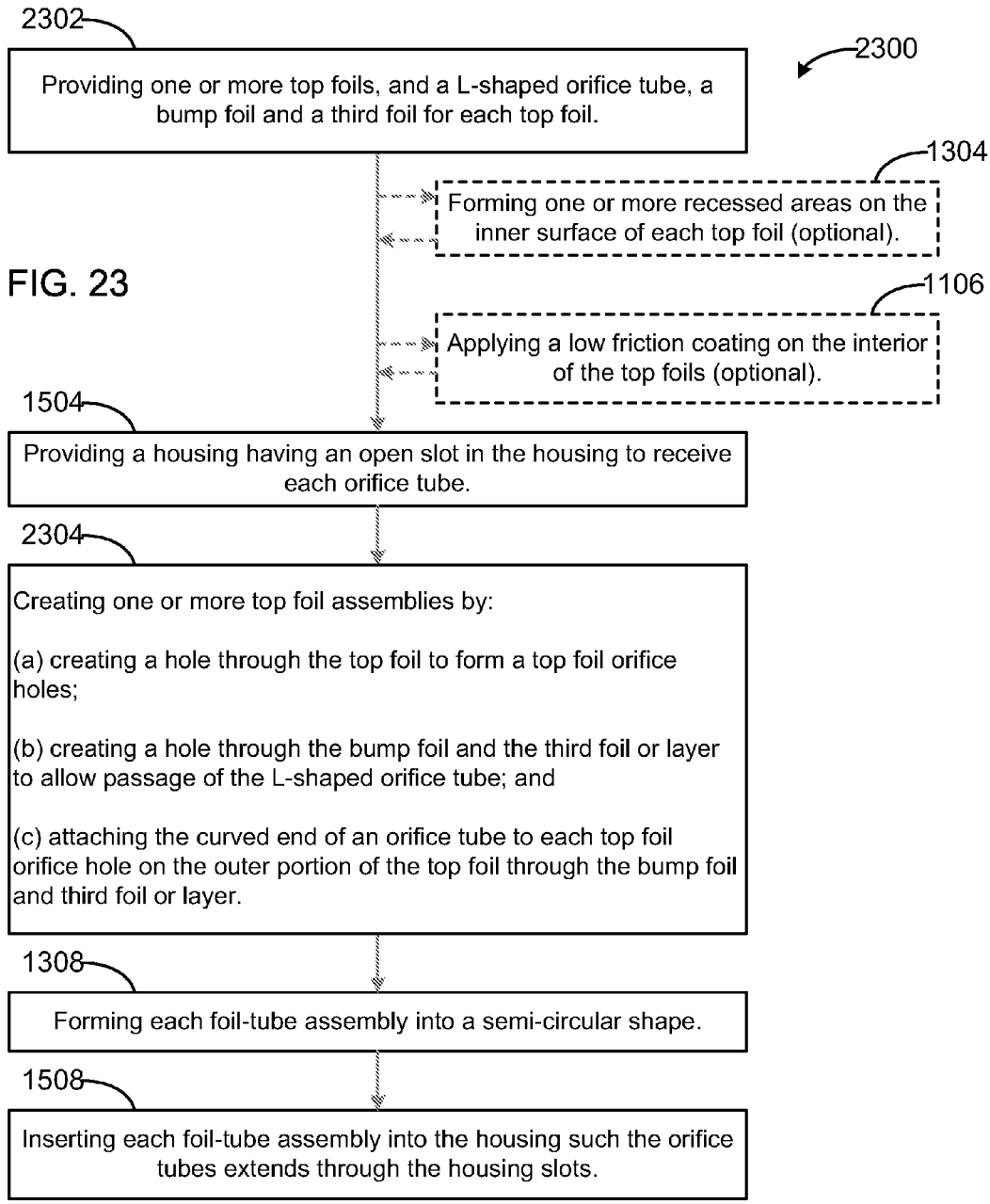

HYBRID AIR FOIL BEARING AND METHOD OF MANUFACTURE

CROSS-REFERENCE TO RELATED APPLICATIONS

This application claims priority to U.S. Provisional Application Ser. No. 61/147,431, filed Jan. 26, 2009, which is incorporated by reference herein in its entirety.

FIELD OF THE INVENTION

The present invention relates generally to the field of bearings and, more particularly, to a hybrid air foil bearing and method of manufacture.

BACKGROUND OF THE INVENTION

Oil lubricated rolling element bearings or sleeve bearings are widely used to support rotors in various types of turbomachinery due to their large load capacity and predictable performance. However, oil lubrication circuits make these systems complicated and environmentally unfriendly. Another type of bearing, the traditional hydrostatic air bearing with solid circular wall (without bump foil and top foil) is widely used in machine tool applications. However, the traditional hydrostatic air bearings have a limited capability to accommodate rotor-bearing misalignment, debris, and contaminations.

In contrast to traditional hydrostatic air bearings, air foil bearings (also referred to as gas foil bearings) have large load capacity (at high speeds) and can tolerate rotor-bearing misalignment and debris. Moreover, in midsized turbomachinery, air foil bearings offer an alternative solution to the oil lubricated bearings because the systems are light and compact, and can improve reliability. Air foil bearings not only offer very low friction during operation but also circumvent the need of oil lubrication circuits, seals, and oil cooling system, allowing the system to be less complicated and more environment-friendly. Accordingly, air foil bearings are often used in auxiliary power units (APU), air management systems for aircraft, automobiles, micro-gas turbines (MGT) as independent power generators or for fuel cell-MGT hybrid systems, turbochargers, turbo compressors, and other applications.

Referring now to FIG. 1, a typical configuration of a bump foil air or gas bearing 100 is shown in accordance with the prior art. The air foil bearing 100 includes a smooth top foil 102 and a corrugated bump foil 104 disposed within a housing or bearing sleeve 106. The bump foil 104 sustains the applied load from the journal or shaft 108 and provides structural stiffness and damping. The bump foil 104 can also accommodate misalignments and distortions of the shaft 108. The top foil 102 and corrugated bump foil 104 are single pieces welded together at one end 110 such that the other end 112 is free to move. Note that other compliant structures can be used instead of the bump foil 104, such as multiple bump foils and overlapping top foils (U.S. Patent Application Publication No. 2002/0097927), multiple top foils with actuators (U.S. Pat. No. 6,582,125), etc. The structure of the compliant structure determines the overall performance and characteristics of the air foil bearing 100.

While it is stationary, the journal, rotor or shaft 108 sits on the top foil 102, forming a wedge shape between the top foil 102 and rotor 108. When the rotor 108 starts to spin, hydrodynamic pressure is generated from the wedge, lifting the rotor 108 to be completely airborne (air space 114). The bump foil 104 deforms elastically according to the generated pressure and friction of the bearing becomes very small. As a result, air foil bearings 100 can very effectively accommodate misalignment and rotor growth (both centrifugal and thermal). In addition, air foil bearings 100 can use any gas as a working and cooling fluid, there is no need for additional lubrication mechanisms, thus enabling the construction of a compact and maintenance free system.

Despite extensive research on air foil bearings 100 and successful applications to many oil-free turbomachinery at low to intermediate temperature ranges, successful implementation of air foil bearings 100 on high temperature applications such as small gas turbines are very few. The air foil bearings 100 have limited reliability issue that comes from dry rubbing during start/stops and limited heat dissipation capability. It can be assumed that the air has very small viscosity compared to oil, and thus cooling is not as critically important as oil-lubricated hydrodynamic bearings. However, very small clearance and high speed operation can generate fairly good amount of heat that cannot be neglected. Regardless of lubricating media, the hydrodynamic pressure provides only load-support but not dissipation of parasitic energy generated by viscous drag or heat input from other parts of the machine. It is well known that the purpose of continuous oil circulation in oil lubricated hydrodynamic bearings is to dissipate parasitic energy generated within/transferred to the bearing, and keep the oil temperature within certain limit so that the oil can generate necessary hydrodynamic pressure.

Very often critical advantages of air foil bearing 100 are claimed as no lubrication circuit and little friction (no heating), providing a "simple" environment-friendly solution. However, considering the two critical functions (load support and parasitic energy dissipation) of the bearings, the hydrodynamic air foil bearing 100 cannot be as simple as claimed. In fact, the success of bump foil bearings in industrial applications owes to continuous air cooling through the space behind the top foil 102 and adequate surface coatings that can survive dry rubbings during start/stops. The importance of cooling and wear-resistant coating is more evident when the hydrodynamic air foil bearings 100 are operated under large external loads.

One of the critical technical issues related to reliability of the air foil bearings 100 is wear on the top foil 102 and rotor 108 during start/stops. The hydrodynamic pressure is generated only when the rotor 108 reaches a certain speed. At start/stop and low speeds the hydrodynamic pressure is not large enough and rubbing/wear happens on the top foil 102 and rotor 108. The susceptibility to wear prevents widespread use of the air foil bearing 100 technology in large turbo machines. In large turbo machines, rotor 108 weight itself is similar to the load capacity of the bearing at high speeds. Therefore, at low speeds, the bearing do not have enough load capacity and suffer severe dry rubbing, wear, heat generation, and eventually failure. Bearing cooling is also mandatory for certain applications because the foil bearings can generate a significant amount of heat depending on the operating conditions. Usually axial flow is used through the space between the top foil 102 and bearing sleeve or housing 106.

The notorious thermal runaway of air foil bearings 100 comes from mainly rotor 108 thermal expansion/distortion rather than the bearing itself. Because the cooling air passes through the space behind the top foil 102, the cooling efficiency is low and can consume a lot of air to achieve required cooling performance. Furthermore, current cooling methods cannot be effective in controlling the rotor thermal distortion.

As a result, another method to address the cooling limitations of hydrodynamic air foil bearings 100 and the dry rubbing issue was developed.

In small machines, the rotor weight does not impose significant load to the AFB during start/stops, and relevant dry rubbing is not critical issue compared to the rotor-bearing instability at high speeds. However, as machine size increases, the rotor weight increases in proportion to the third power of rotor characteristic dimension while the AFB's load capacity increases in proportion to the second power of rotor characteristic dimension. Therefore, hydrodynamic AFBs have a definitive load capacity limit as the machine size increases. Furthermore, the hydrodynamic AFBs with adequate load capacity at machine operating speed has to rely on boundary lubrication with surface coatings during start/stops, yielding inevitable surface wear and limited reliability. Much progress was reported on the surface coatings on the AFBs [1-4], and successful application of one of these coatings to small power generation turbines is reported in [5]. For example, NASA has been developing a PS 300 series ceramic metal composite coating for high temperature applications. Mohawk Innovative Technology has also developed a series of metal-ceramic composite coatings applied to the top foil 102 via a thermal spray process. Other low friction coatings are disclosed in U.S. Patent Application Publication Nos. 2007/0003693 and 2008/0057223. These types of coatings have shown proven performance at limited temperature ranges depending on the material composition. Because of the limited performance of these solid lubricants, the wear of the top foil 102 and rotor 108 is inevitable during the repeated start and stop cycles, and performance also degrades accordingly. However, in mid-sized turbomachinery where journal diameter is bigger than 100 mm (~4 inch), the reliability issue associated with dry rubbing during start/stop seems unavoidable as presented in [6].

Hydrostatic gas bearings with cylindrical solid wall began to appear for military and space applications in 60's [7-9] to avoid the dry rubbing during start/stop. Other forms of hydrostatic gas bearings were reported since then; Curwen et al [10] reported tilting pad gas bearing with hydrostatic orifice formed on the spherical pivot for Brayton cycle turbo generator. Han et al [11] investigated dynamic performance of cylindrical hydrostatic air bearing with multiple inherent restrictors along the circumferential and axial directions for precision machine tool applications. More recently, hydrostatic operation was applied to three-lobed gas bearing [12] and flexure pivot tilting pad gas bearing [13, 14]. The concept of the hydrostatic lift can be found in a patent on foil thrust bearing [15]. However, in the patent [15], compressor bleed air is discharged to the backside of the top foil (i.e., space taken by bump foils) and then guided to the air film through multiple holes formed on the top foil. The concept is very questionable in terms of effectiveness because the pressure on the backside of the top foil is higher than hydrostatic pressure generated in the air film, resulting in no hydrostatic lift. Application of hydrostatic bearing concept can be also found in a sheet metal forming and tape recorders [16], where the sheet metal or tape under tension is called a foil.

Active magnetic bearings also enable rubbing-free start/stops of the rotor, and the technology has been developed since early 90's as a magnetic-foil hybrid [17-19] or just magnetic bearing [20]. However, active magnetic bearings require complicated controllers, and full active control of a rotor with complicated dynamic motions is a significant challenge and real field applications are still very limited.

General interest in large AFBs (diameter>100 mm) has evolved from many gas-processing and military applications. The Mechanical Systems Branch within the Turbine Engine Division at Propulsion Directorate of US Air Force Research Laboratory (AFRL) has performed extensive research on AFB technology and its integration to high-speed engines for future aircraft and weapon systems [24].

Now referring to FIGS. 2A, 2B and 2C, a hybrid air foil bearing (HAFB) 200 is shown. The HAFB 200 includes a smooth top foil 102 disposed within a housing or bearing sleeve 106. The compliant structure is formed by twenty-four compression or coil springs 202 inserted within longitudinal bores 204 along the circumference of the interior wall 206 of the housing 106, such that a portion of the coil springs 202 extend slightly into the interior 208 of the housing 106 to support the top foil 102. A small stainless steel tube (hydrostatic air line) 210 with an inner diameter of approximately 1 mm is connected to each top foil orifice (air supply hole) 212 having a diameter of approximately 0.5 mm located in the middle of the top foil 102 via rubber tubes 214. The top foil orifices 212 are spaced apart from one another along the circumference of the top foil 102. As shown, the four hydrostatic air lines 210 are disposed within some of the longitudinal bores 204 and exit the housing 106. Details of the HAFB are disclosed by the following documents: (1) D. Kim and S. Park, "Hybrid Air Foil Bearings with External Pressurization," ASME International Mechanical Engineering Congress and Exposition, ASME Paper IMECE2006-16151, (Nov. 5-10, 2006); (2) S. Park, "Hybrid Air Foil Bearings with External Pressurization," Master of Science Thesis, Texas A&M University (May 2007); and (3) D. Kim and S. Park, "Hydrostatic Air Foil Bearings: Analytical and Experimental Investigation," (Sep. 20, 2008), to be published in Tribology International, vol. 42, issue 3, pages 413-425 (March 2009).

The HAFB 200 combines benefits of air foil bearings and hydrostatic air bearings, providing very little friction during start/stops and stable operation due to damping of the elastic foundations. The hydrostatic air line 210 to the inside of the bearing clearance serves as effective energy dissipation mechanism via forced convective cooling of both the bearing and rotor surfaces. In addition, the HAFB 200 can eliminate the chronic wears of the top foil 102 and rotor 108 during startups and stops. The hydrostatic air serves as very effective cooling mechanism without any additional cooling air. Moreover, the HAFB 200 provides higher load capacity as compared to its hydrodynamic counterpart (with traditional cooling). The air flow rate used for hydrostatic operation is less than 10% of the cooling air flow used for hydrodynamic foil bearing. In addition, orbit simulations showed increased stability of the rotor bearing system due to external pressurization.

Despite these benefits and improvements, the HAFB (coil spring configuration) 200 is more expensive to manufacture than its inferior counterparts. Moreover, the one-to-one ratio of top foil orifices 212 to hydrostatic air lines 210, the connection of the hydrostatic air lines 210 to the top foil 102, and the exits for the hydrostatic air lines 210 through the housing 106 limit the effectiveness and durability of the HAFB 200. As a result, there is a need for a HAFB that is relatively inexpensive to manufacture and provides improved effectiveness and durability over current designs.

SUMMARY OF THE INVENTION

The present invention provides a hybrid air foil bearing (HAFB) that is relatively inexpensive to manufacture and provides improved effectiveness and durability over the HAFB (coil spring configuration). More specifically, the present invention provides, in part, increased load capacity at low speeds during start/stops, reduced initial friction drag and wear (of top foil and rotor), and reduced hydrodynamic instability. As a result, the present invention is ideal for use in heavily loaded high temperature applications (e.g., turbo chargers, oil-free turbo compressors/blowers, gas turbines, aircraft engines, high-speed engines, weapon systems, etc.).

One embodiment of the present invention provides an air foil bearing for supporting a shaft by an air layer formed between a substantially circular inner surface of a housing and the shaft, wherein the air foil bearing includes a top foil, one or more orifice tubes and two or more bump foil strips. The top foil is formed into a substantially circular shape having one or more sets of top foil orifice holes, wherein each set of top foil orifice holes comprise at least three top foil orifice holes along a circumference of the circular-shaped top foil. An orifice tube is provided for each set of top foil orifice holes. The orifice tube includes (a) a flat side having a set of tube orifice holes such that each tube orifice hole is substantially aligned with one of the top foil orifice holes when the flat side of the orifice tube is connected to an outer surface of the top foil, (b) a closed end, (c) an open end, and (d) a bend proximate to the open end. The bump foil strip is attached to the outer surface of the top foil adjacent to each side of each orifice tube. The housing also includes an opening extending through the housing to receive the open end of each orifice tube. Alternatively, the housing may also include a circumferential groove formed on the inner surface to receive each orifice tube.

Another embodiment of the present invention provides an air foil bearing for supporting a shaft by an air layer formed between a substantially circular inner surface of a housing and the shaft, wherein the air foil bearing includes a top foil having at least three top foil sections, one or more orifice tubes and two or more bump foil strips. The top foil sections are formed into a substantially circular shape having one or more sets of top foil orifice holes, wherein each set of top foil orifice holes comprise at least three top foil orifice holes along a circumference of the circular-shaped top foil. An orifice tube is provided for each set of top foil orifice holes. The orifice tube includes (a) a flat side having a set of tube orifice holes such that each tube orifice hole is substantially aligned with one of the top foil orifice holes when the flat side of the orifice tube is connected to an outer surface of the top foil sections, (b) a closed end, (c) an open end, and (d) a bend proximate to the open end. The bump foil strip is attached to the outer surface of the top foil sections adjacent to each side of each orifice tube. The housing also includes an opening extending through the housing to receive the open end of each orifice tube. Alternatively, the housing may also include a circumferential groove formed on the inner surface to receive each orifice tube.

Yet another embodiment of the present invention provides an air foil bearing for supporting a shaft by an air layer formed between a substantially circular inner surface of a housing and the shaft, wherein the air foil bearing includes a top foil having at least three top foil sections, one or more orifice tubes and two or more bump foil strips. The top foil sections are formed into a substantially circular shape having one or more sets of top foil orifice holes, wherein each set of top foil orifice holes comprise at least three top foil orifice holes along a circumference of the circular-shaped top foil. A recessed area is provided in an inner surface of the top foil sections such that one or more of the top foil orifice holes are disposed within the recessed area. An orifice tube is provided for each set of top foil orifice holes. The orifice tube includes (a) a flat side having a set of tube orifice holes such that each tube orifice hole is substantially aligned with one of the top foil orifice holes when the flat side of the orifice tube is connected to an outer surface of the top foil sections, (b) a closed end, (c) an open end, and (d) a bend proximate to the open end. The bump foil strip is attached to the outer surface of the top foil sections adjacent to each side of each orifice tube. The housing also includes an opening extending through the housing to receive the open end of each orifice tube. Alternatively, the housing may also include a circumferential groove formed on the inner surface to receive each orifice tube.

The present invention also provides a method of manufacturing an air foil bearing by providing: (a) one or more the orifice tubes wherein each orifice tube has a flat side, a closed end, an open end, and a bend proximate to the open end; (b) a top foil; and (c) a housing having an opening extending through the housing to receive the open end of each orifice tube. A foil-tube assembly is created by attaching the flat side of the orifice tube(s) to an outer surface of the top foil, creating a set of holes through the inner surface of the top foil and the flat side of the orifice tube to form a set of top foil orifice holes and corresponding orifice tube holes, and attaching a bump foil strip to the outer surface of the top foil adjacent to each side of each orifice tube. The foil-tube assembly is formed into a substantially circular shape, and the foil-tube assembly is inserted into the housing such the open end of the orifice tubes extends through the housing openings. Additional steps can be added to manufacture the other embodiments described herein. For example, (a) forming a circumferential groove is on an inner surface of the housing to receive each orifice tube; (b) applying a low friction coating to an inner surface of the top foil; (c) using a top foil having three or more top foil sections; or (d) forming one or more recessed areas in an inner surface of the top foil such that one or more of the top foil orifice holes are disposed within the recessed area.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 6 is a flow chart illustrating the method of manufacturing the hybrid air foil bearing of FIGS. 4A and 4B in accordance with one embodiment of the present invention;

FIG. 9 is a flow chart illustrating the method of manufacturing the hybrid air foil bearing of FIG. 7 in accordance with another embodiment of the present invention;

FIG. 11 is a flow chart illustrating the method of manufacturing the hybrid air foil bearing of FIGS. 10A and 10B in accordance with another embodiment of the present invention;

FIG. 13 is a flow chart illustrating the method of manufacturing the hybrid air foil bearing of FIGS. 12A-12G in accordance with another embodiment of the present invention;

FIGS. 16A-16E depict various views of a hybrid air foil bearing (three pad configuration with axial channel) in accordance with another embodiment of the present invention;

FIG. 17 is a flow chart illustrating the method of manufacturing the hybrid air foil bearing of FIGS. 16A-16B in accordance with another embodiment of the present invention;

FIG. 21 is a flow chart illustrating the method of manufacturing the hybrid air foil bearing of FIGS. 20A-20B in accordance with another embodiment of the present invention;

FIG. 23 is a flow chart illustrating the method of manufacturing the hybrid air foil bearing of FIGS. 22A-22C in accordance with another embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Kim and Park [21] presented the first exploratory experimental work on hydrostatic air foil bearing (HAFB), combining hydrodynamic action with a hydrostatic lift through inherent restrictor formed on the top foil. Kumar and Kim [22] presented a computational model to predict stiffness and damping coefficients of the HAFB. The study shows that HAFB has much smaller cross-coupled stiffness than hydrodynamic AFB in general, and these coefficients are strong function of orifice sizes, supply pressure, etc. Kumar and Kim [23] further developed the concept of the HAFB by applying the principle of HAFB to bump foil bearings. They presented experimental work on load capacity of second generation HAFB with bump foils with higher support stiffness than the first design presented in [21]. Low speed tests at 10,000 rpm for HAFB with 38.1 mm diameter resulted in more than 150 N load capacity with supply pressure of 4 bar. Both theoretical work in [22] and experimental works on HAFB [21] were on circular HAFB with continuous single top foil with four inherent restrictors.

Figure 1:
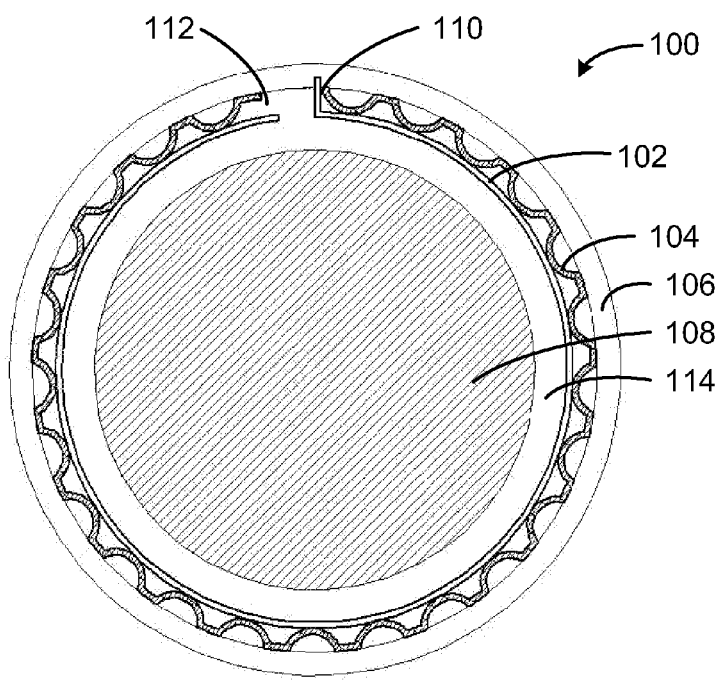
FIG. 1 depicts a cross-sectional view of a typical bump foil air or gas bearing in accordance with the prior art.
Figure 2A:
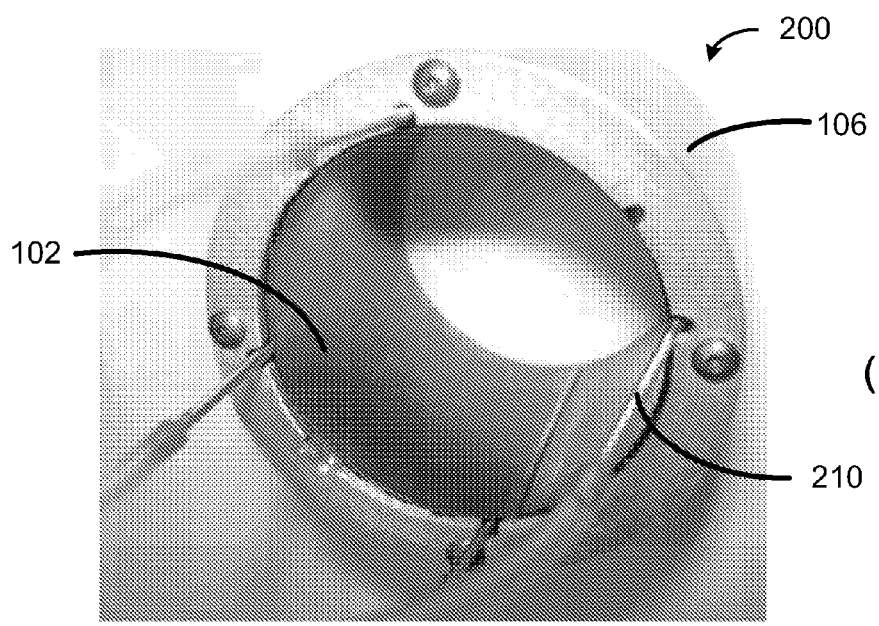
FIGS. 2A, 2B and 2C depict various views of a hybrid air foil bearing (HAFB) in accordance with the prior art.
Figure 2B:
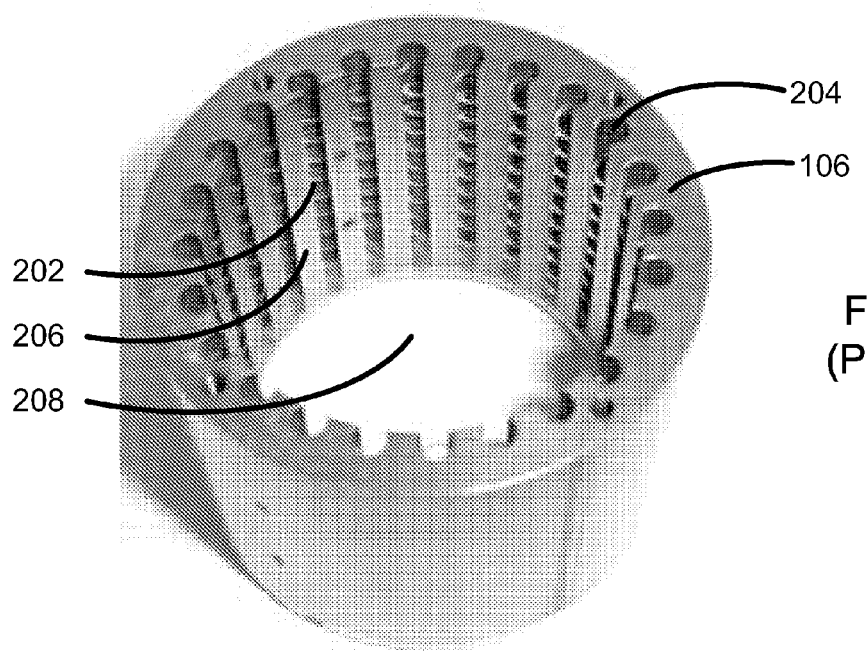
Figure 2C:
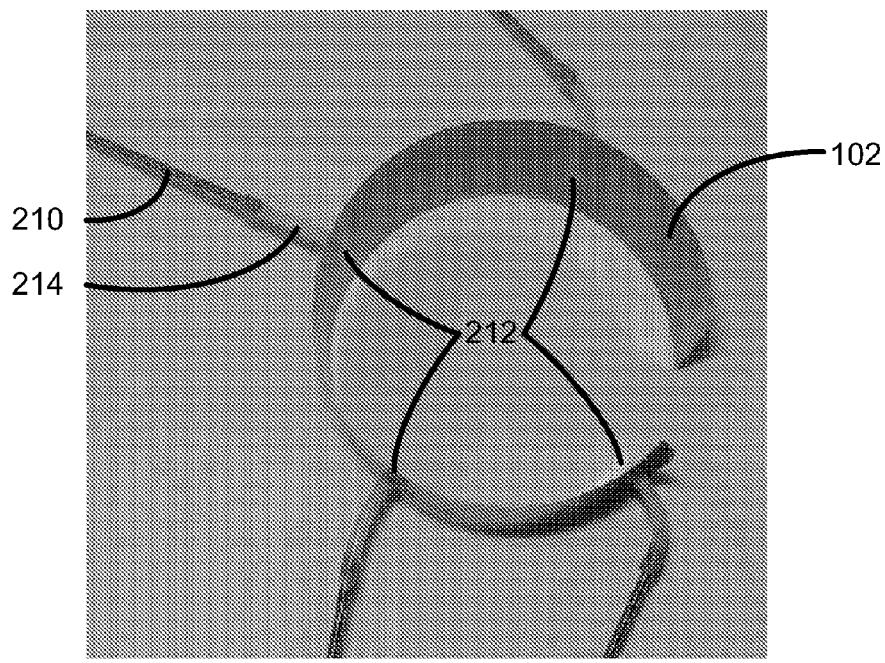
Figure 3A:
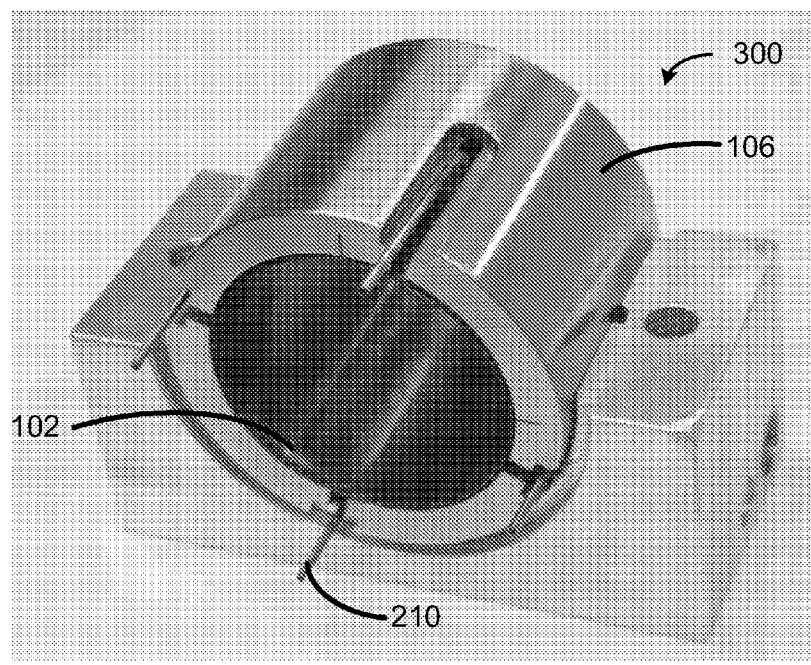
FIGS. 3A and 3B depict various views of a hybrid air foil bearing using a bump foil configuration.
Figure 3B:
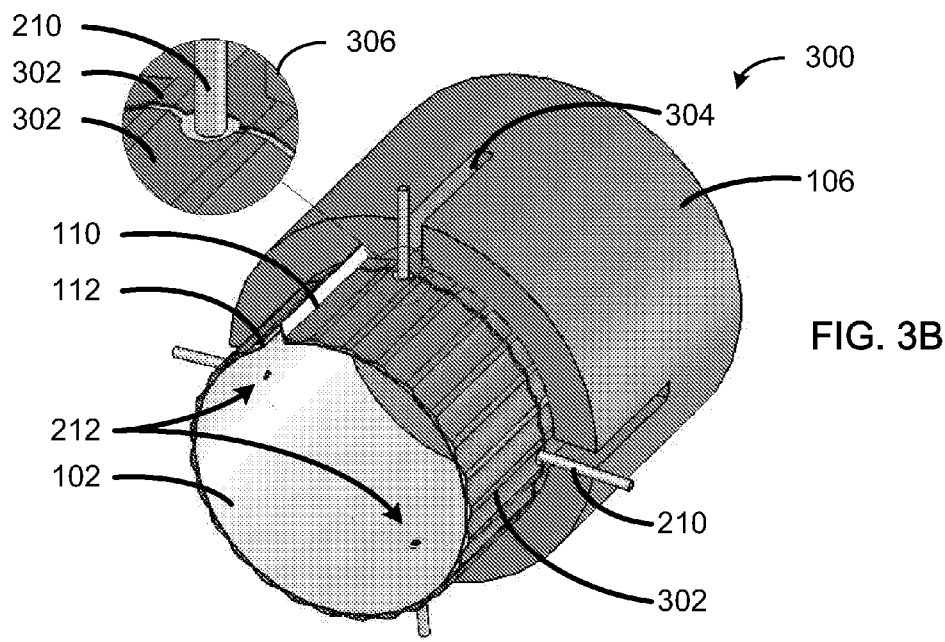

Referring now to FIGS. 3A and 3B, a hybrid air foil bearing (HAFB) 300 using a bump foil configuration is shown. The HAFB 300 includes a smooth top foil 102 and a pair of adjacent corrugated bump foils 302 disposed within a housing or bearing sleeve 106. The pair of adjacent corrugated bump foils 302 are welded to the top foil 102 at one end 110 such that the other end 112 is free to move. The top foil 102 has four top foil orifices 212 spaced 80 to 100 degrees apart from one another along the circumference of the top foil 102 (e.g., $\theta=72°$, 166°, 247°, and 341°). This unsymmetrical placement is designed to position the top foil orifices 212 on top of the bumps of bump foils 302 (see inset area 306). A small stainless steel tube (hydrostatic air line) 210 is connected to each top foil orifice (air supply hole) 212 located in the middle of the top foil 102. As shown, the four hydrostatic air lines 210 exit the housing 106 through open slots 304 in the housing 106. Details of the HAFB (bump foil configuration) 300 are disclosed by the following documents, which are hereby incorporated by reference and attached hereto as Appendix A and B: (A) M. Kumar and D. Kim, "Parametric Studies on Dynamic Performance of Hybrid Air Foil Bearing," J. Eng. Gas Turbines Power 130, 062501 (2008); and (B) M. Kumar, "Analytical and Experimental Investigations of Hybrid Air Foil Bearings," Master of Science Thesis, Texas A&M University (August 2008).

Three embodiments of the present invention will now be described in reference to FIGS. 4A-B, 5A-E, 6A, 7, 8A-B, 9, 10A-B and 11. The present invention provides a hybrid air foil bearing (HAFB) that is relatively inexpensive to manufacture and provides improved effectiveness and durability over the HAFB (coil spring configuration) and HAFB (bump foil configuration). More specifically, the present invention provides, in part, increased load capacity at low speeds during start/stops, reduced initial friction drag and wear (of top foil and rotor), and reduced hydrodynamic instability. As a result, the present invention is ideal for use in heavily loaded high temperature applications (e.g., turbo chargers, oil-free turbo compressors/blowers, gas turbines, aircraft engines, high-speed engines, weapon systems, etc.).

Figure 4A:
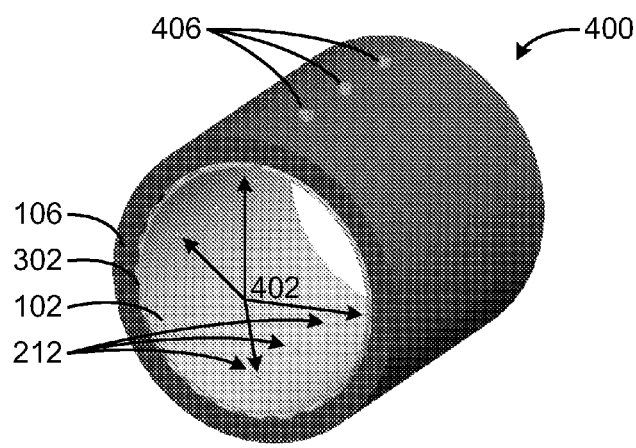
FIGS. 4A and 4B depict various views of a hybrid air foil bearing (single top foil configuration) in accordance with one embodiment of the present invention.
Figure 4B:
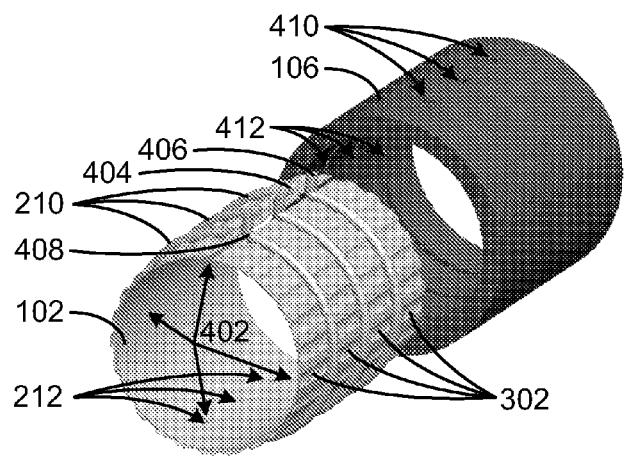

Now referring to FIGS. 4A and 4B, various views of a hybrid air foil bearing 400 (single top foil configuration, hereinafter referred to as HAFB1) for supporting a shaft, rotor or journal by an air layer formed between a substantially circular inner surface of a housing 106 and the shaft in accordance with one embodiment of the present invention are shown. The HAFB1 400 includes a top foil 102 formed into a substantially circular shape having one or more sets 402 of top foil orifice holes 212, wherein each set 402 of top foil orifice holes 212 includes at least three top foil orifice holes 212 that are spaced apart from one another along a circumference of the circular-shaped top foil 102. Unlike the HAFB 300 (bump foil configuration), the top foil orifice holes 212 in the HAFB1 400 can be spaced approximately equidistant apart from one another without regard for the location of the top bump of bump foil strips 302. Each set 402 of top foil orifice holes 212 has a corresponding orifice tube (hydrostatic air line) 210 that extends through housing openings 410 to facilitate connections to external hydrostatic air supply lines.

Figure 5A:
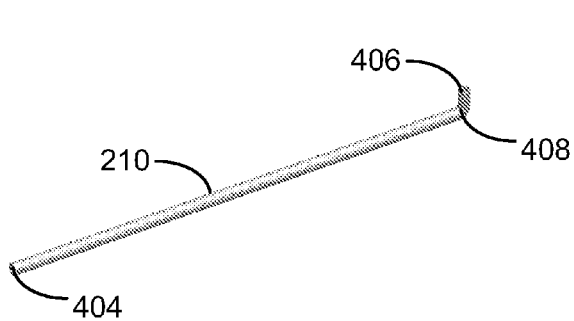
FIGS. 5A-E depict various views of the hybrid air foil bearing of FIGS. 4A and 4B during the manufacturing process in accordance with one embodiment of the present invention.
Figure 5B:
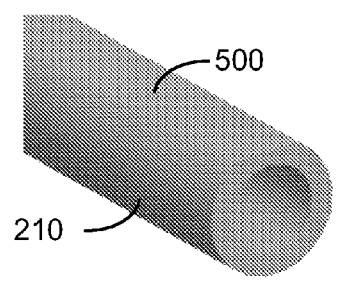
Figure 5C:
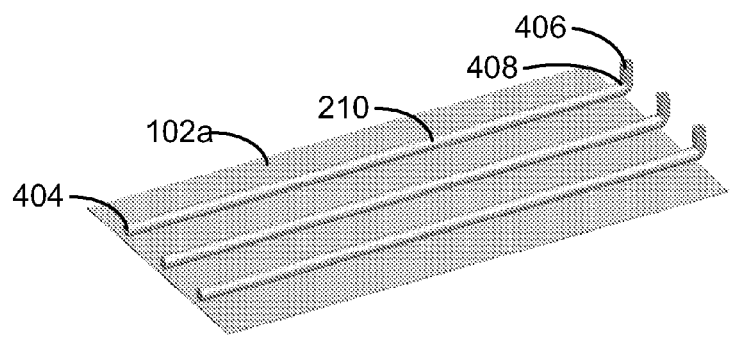
Figure 5D:
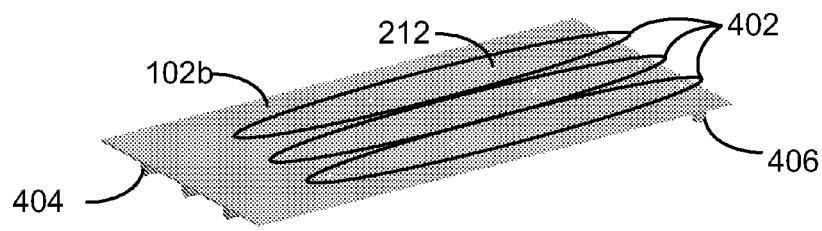

As shown in FIGS. 5B and 5D, the orifice tube 210 has (a) a flat side 500 having a set of tube orifice holes (not shown) such that each tube orifice hole is substantially aligned with one of the top foil orifice holes 212 when the flat side 500 of the orifice tube 210 is connected to the outer surface of the top foil 102, (b) a closed end 404, (c) an open end 406, and (d) a bend proximate to the open end. The bend 408 permits the open end 406 to extend through a housing opening 410 extending through the housing 106. A bump foil strip 302 is attached to the outer surface of the top foil 102 adjacent to each side of each orifice tube 210. So, if there is one orifice tube 210, there will be two bump foil strips 302; if there are two orifice tubes 210, there will be three bump foil strips 302; if there are three orifice tubes 210, there will be four bump foil strips 302; and so on. Note that the shape of the bump foil strip 302 is not limited to that shown in the figures. The top foil 102 and the bump foil strips 302 are typically made from a nickel-based alloy (e.g., an inconel material), which has high thermal stability and elastic limit. Other materials can be used if they satisfy the operating requirements. As shown in FIG. 4B, a circumferential groove 412 is formed on the inner surface of the housing 106 to receive each orifice tube 210. Note that housing openings 410 extend into the circumferential grooves 412.

In an alternative embodiment a low friction coating having heat and abrasion resistance can be added to the interior of the top foil 102. Some examples of these low friction coatings are described in U.S. Patent Application Publication Nos. 2007/0003693 and 2008/00572223 which are hereby incorporated by reference. In another alternative embodiment, the circumferential grooves 412 can be eliminated as long as the height of the bumps on the bump foil strips 302 is sufficiently greater than the height of the orifice tubes 210.

Referring now to FIGS. 5A-E, various views of the hybrid air foil bearing 400 (single top foil configuration) of FIGS. 4A and 4B during the manufacturing process in accordance with one embodiment of the present invention are shown. As previously described and shown in FIGS. 5A and 5B, the orifice tube 210 has a flat side 500, a closed end 404, and an open end 406. The closed end 404 does not have to be circular in shape and can be mechanically crushed or crimped to seal the end 404. The orifice tube 210 also has a bend 408 proximate to the open end 406. The orifice tube 210 is typically made of stainless steel or other suitable material. Moreover, the orifice tube 210 does not have to have a substantially circular cross section as shown. Instead, the orifice tube 210 can have a rectangular, triangular, polygonal or other suitable cross section.

As shown in FIG. 5C, the orifice tubes 210 are attached to the outer surface 102a of the top foil 102 by blazing or resistive welding. The flat side 500 of the orifice tube 210 is the mating surface for attachment to the outer surface 102a of the top foil 102. The top foil 102 is typically made from a nickel-based alloy (e.g., an inconel material), which has high thermal stability and elastic limit. Other materials can be used if they satisfy the operating requirements.

Thereafter and as shown in FIG. 5D, holes are drilled through the inner surface 102b of the top foil 102 and the flat side 500 of the orifice tube 210 to form the top foil orifice holes 212 and orifice tube holes (not shown). The holes 212 can be drilled or EMD machined. Fabricating the holes 212 in this manner eliminates alignment problems associated with creating the top foil orifice holes 212 and orifice tubes holes (not shown) separately prior to assembly. As a result, each orifice tube hole (not shown) is substantially aligned with one of the top foil orifice holes 212. Moreover, each orifice tube 210 has a set 402 of top foil orifice holes 212 that includes at least three top foil orifice holes 212. Although any spacing or number of top foil orifice holes 212 can be used, three to eight top foil orifice holes 212 that are approximately equidistant from one another along a circumference of the circular-shaped top foil 102 is preferred. The present invention is not limited to the specific orientation of the top foil orifice holes 212 to the orifice tubes 210 shown in FIG. 5D. Alternatively, a low friction coating having heat and abrasion resistance can be added to the interior surface 102b of the top foil 102. Some examples of these low friction coatings are described in U.S. Patent Application Publication Nos. 2007/0003693 and 2008/00572223 which are hereby incorporated by reference.

Figure 5E:
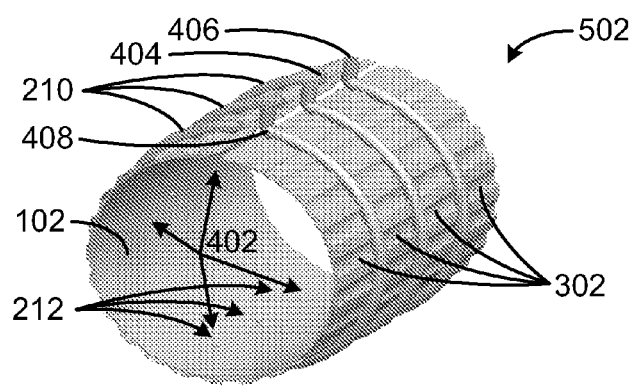

As shown in FIG. 5E, bump foil strips 302 are attached (spot-welded or other suitable methods) to the outer surface of the top foil 102 adjacent to each side of each orifice tube 210 along the axial direction. So, if there is one orifice tube 210, there will be two bump foil strips 302; if there are two orifice tubes 210, there will be three bump foil strips 302; if there are three orifice tubes 210, there will be four bump foil strips 302; and so on. Note that the shape of the bump foil strip 302 is not limited to that shown in the figures. The bump foil strips 302 are typically made from a nickel-based alloy (e.g., an inconel material), which has high thermal stability and elastic limit. Other materials can be used if they satisfy the operating requirements. Thereafter, the foil-tube assembly 502 is formed into a substantially circular shape via hot forming using a pre-shaped jig. As shown in FIG. 4B, a circumferential groove 412 is formed on the inner surface of the housing 106 to receive each orifice tube 210. As shown in FIGS. 4A and 4B, the foil-tube assembly 502 is then inserted into the housing or bearing sleeve 106 such that the orifice tubes 210 rest in the circumferential grooves 412 and the open end 406 of the orifice tubes 210 extends through the housing openings 410 to form the HAFB1 400. In another alternative embodiment, the circumferential grooves 412 can be eliminated as long as the height of the bumps on the bump foil strips 302 is sufficiently greater than the height of the orifice tubes 210.

Now referring to FIG. 6, a flow chart illustrating the method 600 of manufacturing the hybrid air foil bearing 400 (single top foil configuration) of FIGS. 4A and 4B in accordance with one embodiment of the present invention is shown. One or more the orifice tubes are provided in block 602. Each orifice tube has a flat side, a closed end, an open end, and a bend proximate to the open end. A top foil is provided in block 604. If desired, the optional step of applying a low friction coating on the interior of the top foil is shown in block 606. A housing having an opening extending through the housing to receive the open end of each orifice tube is provided in block 608. If desired, the optional step of forming a circumferential groove on the inner surface of the housing to receive each orifice tube is shown in block 610. A foil-tube assembly is created in block 612 by: (a) attaching the flat side of the orifice tube(s) to an outer surface of the top foil via blazing, resistive welding or other suitable methods; (b) creating a set of holes through the inner surface of the top foil and the flat side of the orifice tube via drilling or EMD machining to form a set of top foil orifice holes and corresponding orifice tube holes; and (c) attaching a bump foil strip to the outer surface of the top foil adjacent to each side of each orifice tube. The foil-tube assembly is formed into a substantially circular shape via hot forming using a pre-shaped jig in block 614. The foil-tube assembly is then inserted into the housing such the open end of the orifice tubes extends through the housing openings in block 616.

Figure 7:
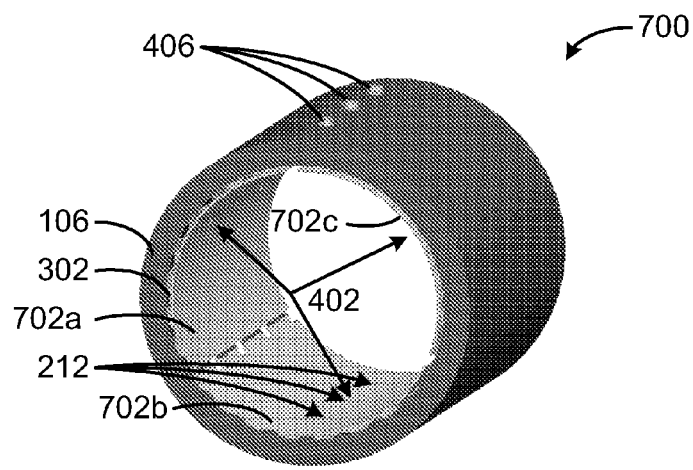
FIG. 7 depicts a perspective view of a hybrid air foil bearing (multiple top foil configuration) in accordance with another embodiment of the present invention.

Referring now to FIG. 7, a perspective view of a hybrid air foil bearing 700 (multiple top foil configuration, hereinafter referred to as HAFB2) for supporting a shaft, rotor or journal by an air layer formed between a substantially circular inner surface of a housing 106 and the shaft in accordance with another embodiment of the present invention is shown. The HAFB2 700 includes a multi-section top foil 702 formed into a substantially circular shape having one or more sets 402 of top foil orifice holes 212, wherein each set 402 of top foil orifice holes 212 includes at least three top foil orifice holes 212 that are spaced apart from one another along a circumference of the circular-shaped top foil 702. As shown, the multi-section top foil 702 has three sections: top foil section 702a; top foil section 702b; and top foil section 702c. Multi-section top foil 702 may include more or less than three sections. Unlike the HAFB 300 (bump foil configuration), the top foil orifice holes 212 in the HAFB2 700 can be spaced approximately equidistant apart from one another without regard for the location of the top bump of bump foil strips 302. As shown, the top foil orifice holes 212 are positioned in the middle of the top foil sections 702a, 702b, and 702c. The present invention is not limited to this orientation. Each set 402 of top foil orifice holes 212 has a corresponding orifice tube (hydrostatic air line) 210 that extends through housing openings 410 to facilitate connections to external hydrostatic air supply lines.

Figure 8A:
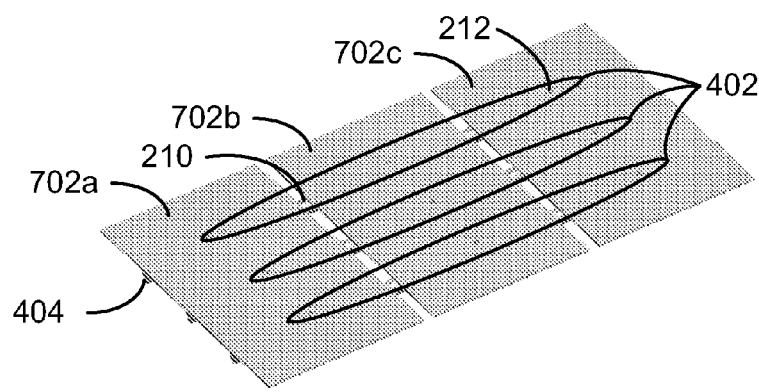
FIGS. 8A and B depict various views of the hybrid air foil bearing of FIG. 7 during the manufacturing process in accordance with another embodiment of the present invention.

As shown in FIGS. 5A, 5B and 8A, the orifice tube 210 has (a) a flat side 500 having a set of tube orifice holes (not shown) such that each tube orifice hole is substantially aligned with one of the top foil orifice holes 212 when the flat side 500 of the orifice tube 210 is connected to the outer surface of the top foil sections 702a, 702b, and 702c, (b) a closed end 404, (c) an open end 406, and (d) a bend proximate to the open end. The bend 408 permits the open end 406 to extend through a housing opening 410 extending through the housing 106. A bump foil strip 302 is attached to the outer surface of the top foil sections 702a, 702b, and 702c adjacent to each side of each orifice tube 210. So, if there is one orifice tube 210, there will be two bump foil strips 302; if there are two orifice tubes 210, there will be three bump foil strips 302; if there are three orifice tubes 210, there will be four bump foil strips 302; and so on. Note that the shape of the bump foil strip 302 is not limited to that shown in the figures. The top foil sections 702a, 702b, and 702c and the bump foil strips 302 are typically made from a nickel-based alloy (e.g., an inconel material), which has high thermal stability and elastic limit. Other materials can be used if they satisfy the operating requirements. A circumferential groove 412 is formed on the inner surface of the housing 106 to receive each orifice tube 210. Note that housing openings 410 extend into the circumferential grooves 412.

In an alternative embodiment a low friction coating having heat and abrasion resistance can be added to the interior of the top foil sections 702a, 702b, and 702c. Some examples of these low friction coatings are described in U.S. Patent Application Publication Nos. 2007/0003693 and 2008/00572223 which are hereby incorporated by reference. In another alternative embodiment, the circumferential grooves 412 can be eliminated as long as the height of the bumps on the bump foil strips 302 is sufficiently greater than the height of the orifice tubes 210.

Figure 8B:
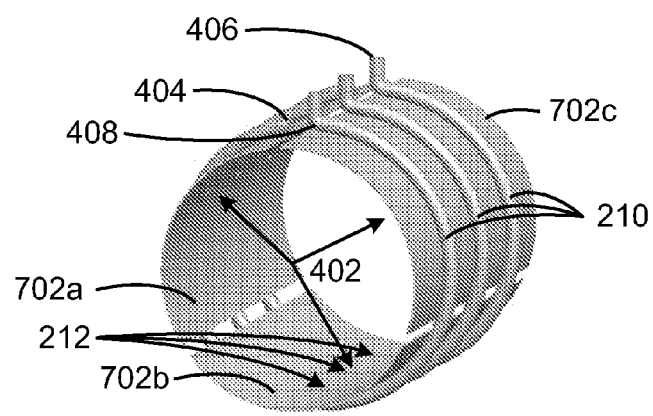

Referring now to FIGS. 8A and 8B, various views of the hybrid air foil bearing 700 (multiple top foil configuration) of FIG. 7 during the manufacturing process in accordance with one embodiment of the present invention are shown. As previously described and shown in FIGS. 5A and 5B, the orifice tube 210 has a flat side 500, a closed end 404, and an open end 406. The closed end 404 does not have to be circular in shape and can be mechanically crushed or crimped to seal the end 404. The orifice tube 210 also has a bend 408 proximate to the open end 406. The orifice tube 210 is typically made of stainless steel or other suitable material. Moreover, the orifice tube 210 does not have to have a substantially circular cross section as shown. Instead, the orifice tube 210 can have a rectangular, triangular, polygonal or other suitable cross section.

The orifice tubes 210 are attached to the outer surface 102a of the top foil 102 by blazing or resistive welding. The flat side 500 of the orifice tube 210 is the mating surface for attachment to the outer surface of the top foil sections 702a, 702b, and 702c. The top foil sections 702a, 702b, and 702c are typically made from a nickel-based alloy (e.g., an inconel material), which has high thermal stability and rigidity. Other materials can be used if they satisfy the operating requirements. Holes are drilled through the inner surface of the top foil sections 702a, 702b, and 702c and the flat side 500 of the orifice tube 210 to form the top foil orifice holes 212 and orifice tube holes (not shown). The holes 212 can be drilled or EMD machined. Fabricating the holes 212 in this manner eliminates alignment problems associated with creating the top foil orifice holes 212 and orifice tubes holes (not shown) separately prior to assembly. As a result, each orifice tube hole (not shown) is substantially aligned with one of the top foil orifice holes 212. Moreover, each orifice tube 210 has a set 402 of top foil orifice holes 212 that includes at least three top foil orifice holes 212. Although any spacing or number of top foil orifice holes 212 can be used, three to eight top foil orifice holes 212 that are approximately equidistant from one another along a circumference of the circular-shaped top foil sections 702a, 702b, and 702c is preferred. The present invention is not limited to the specific orientation of the top foil orifice holes 212 to the orifice tubes 210 shown in FIG. 8A. Alternatively, a low friction coating having heat and abrasion resistance can be added to the interior surface of the top foil sections 702a, 702b, and 702c. Some examples of these low friction coatings are described in U.S. Patent Application Publication Nos. 2007/0003693 and 2008/00572223 which are hereby incorporated by reference.

Bump foil strips 302 are attached (spot-welded or other suitable methods) to the outer surface of the top foil sections 702a, 702b, and 702c adjacent to each side of each orifice tube 210 along the axial direction. So, if there is one orifice tube 210, there will be two bump foil strips 302; if there are two orifice tubes 210, there will be three bump foil strips 302; if there are three orifice tubes 210, there will be four bump foil strips 302; and so on. Note that the shape of the bump foil strip 302 is not limited to that shown in the figures. The bump foil strips 302 are typically made from a nickel-based alloy (e.g., an inconel material), which has high thermal stability and rigidity. Other materials can be used if they satisfy the operating requirements. Thereafter, the foil-tube assembly is formed into a substantially circular shape via hot forming using a pre-shaped jig. A circumferential groove 412 is formed on the inner surface of the housing 106 to receive each orifice tube 210. As shown in FIG. 7, the foil-tube assembly is then inserted into the housing or bearing sleeve 106 such that the orifice tubes 210 rest in the circumferential grooves 412 and the open end 406 of the orifice tubes 210 extends through the housing openings 410 to form the HAFB2 700. In another alternative embodiment, the circumferential grooves 412 can be eliminated as long as the height of the bumps on the bump foil strips 302 is sufficiently greater than the height of the orifice tubes 210 to prevent damage to the orifice tubes 210 and uneven wear on the top foil sections 702a, 702b, and 702c.

Referring now to FIG. 9, a flow chart illustrating the method of manufacturing the hybrid air foil bearing of FIG. 7 in accordance with another embodiment of the present invention is shown. One or more the orifice tubes are provided in block 902. Each orifice tube has a flat side, a closed end, an open end, and a bend proximate to the open end. At least three top foil sections are provided in block 904. If desired, the optional step of applying a low friction coating on the interior of the top foil sections is shown in block 906. A housing having an opening extending through the housing to receive the open end of each orifice tube is provided in block 908. If desired, the optional step of forming a circumferential groove on the inner surface of the housing to receive each orifice tube is shown in block 910. A foil-tube assembly is created in block 912 by: (a) attaching the flat side of the orifice tube(s) to an outer surface of the top foil sections via blazing, resistive welding or other suitable methods; (b) creating a set of holes through the inner surface of the top foil and the flat side of the orifice tube via drilling or EMD machining to form a set of top foil orifice holes and corresponding orifice tube holes; and (c) attaching a bump foil strip to the outer surface of the top foil sections adjacent to each side of each orifice tube. The foil-tube assembly is formed into a substantially circular shape via hot forming using a pre-shaped jig in block 914. The foil-tube assembly is then inserted into the housing such the open end of the orifice tubes extends through the housing openings in block 916.

Figure 10A:
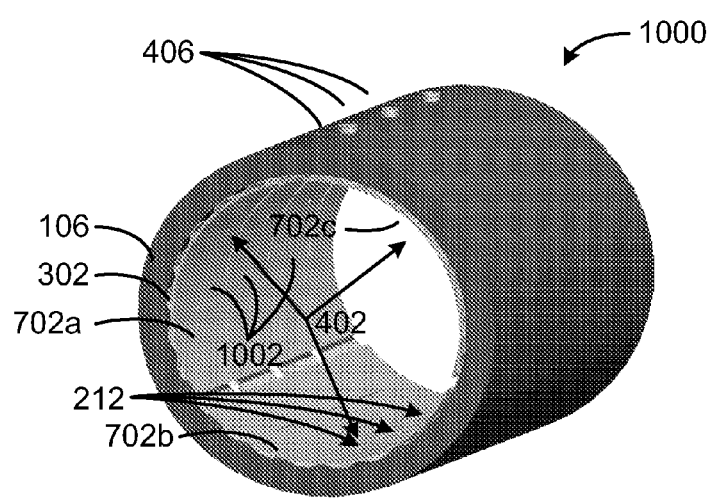
FIGS. 10A and 10B depict various views of a hybrid air foil bearing (multiple top foil configuration with recesses) in accordance with another embodiment of the present invention.
Figure 10B:
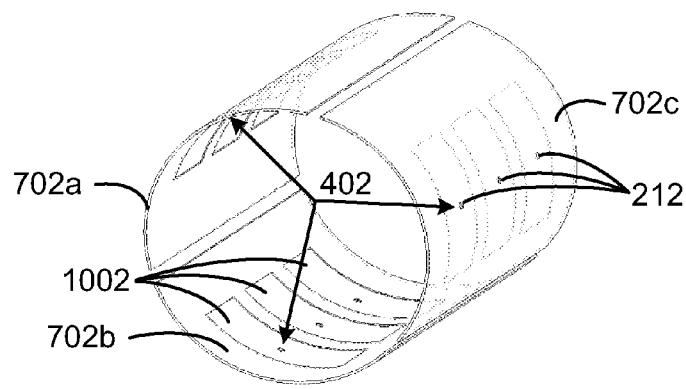

Now referring to FIGS. 10A and 10B, various views of a hybrid air foil bearing 1000 (multiple top foil configuration with recesses, hereinafter referred to as HAFB3) for supporting a shaft, rotor or journal by an air layer formed between a substantially circular inner surface of a housing 106 and the shaft in accordance with another embodiment of the present invention is shown. The HAFB3 1000 includes a multi-section top foil 702 formed into a substantially circular shape having one or more sets 402 of top foil orifice holes 212, wherein each set 402 of top foil orifice holes 212 includes at least three top foil orifice holes 212 that are spaced apart from one another along a circumference of the circular-shaped top foil 102. As shown, the multi-section top foil 702 has three sections: top foil section 702a; top foil section 702b; and top foil section 702c. Multi-section top foil 702 may include more than three sections. Each top foil section 702a, 702b, and 702c has a recessed area 1002 in the inner surface of the respective top foil section. The recessed area 1002 can be rectangular, circular, elliptical, polygonal or other suitable geometric shape. Unlike the HAFB 300 (bump foil configuration), the top foil orifice holes 212 in the HAFB3 1000 can be spaced approximately equidistant apart from one another without regard for the location of the top bump of bump foil strips 302. As shown, the top foil orifice holes 212 are positioned in the middle of the recessed areas 1002 in the top foil sections 702a, 702b, and 702c. The present invention is not limited to this orientation. Multiple top foil orifice holes 212 can be located in each recessed area 1002. Likewise, each top foil section 702a, 702b and 702a can have multiple recessed areas 1002 containing one or more top foil orifice holes 212. The recessed areas 1002 can be formed by etching or machining Each set 402 of top foil orifice holes 212 has a corresponding orifice tube (hydrostatic air line) 210 that extends through housing openings 410 to facilitate connections to external hydrostatic air supply lines.

As shown in FIGS. 5A, 5B and 10B, the orifice tube 210 has (a) a flat side 500 having a set of tube orifice holes (not shown) such that each tube orifice hole is substantially aligned with one of the top foil orifice holes 212 when the flat side 500 of the orifice tube 210 is connected to the outer surface of the top foil sections 702a, 702b, and 702c, (b) a closed end 404, (c) an open end 406, and (d) a bend proximate to the open end. The bend 408 permits the open end 406 to extend through a housing opening 410 extending through the housing 106. A bump foil strip 302 is attached to the outer surface of the top foil sections 702a, 702b, and 702c adjacent to each side of each orifice tube 210. So, if there is one orifice tube 210, there will be two bump foil strips 302; if there are two orifice tubes 210, there will be three bump foil strips 302; if there are three orifice tubes 210, there will be four bump foil strips 302; and so on. Note that the shape of the bump foil strip 302 is not limited to that shown in the figures. The top foil sections 702a, 702b, and 702c and the bump foil strips 302 are typically made from a nickel-based alloy (e.g., an inconel material), which has high thermal stability and rigidity. Other materials can be used if they satisfy the operating requirements. A circumferential groove 412 is formed on the inner surface of the housing 106 to receive each orifice tube 210. Note that housing openings 410 extend into the circumferential grooves 412.

In an alternative embodiment a low friction coating having heat and abrasion resistance can be added to the interior of the top foil sections 702a, 702b, and 702c. Some examples of these low friction coatings are described in U.S. Patent Application Publication Nos. 2007/0003693 and 2008/00572223 which are hereby incorporated by reference. In another alternative embodiment, the circumferential grooves 412 can be eliminated as long as the height of the bumps on the bump foil strips 302 is sufficiently greater than the height of the orifice tubes 210 to prevent damage to the orifice tubes 210 and uneven wear on the top foil sections 702a, 702b, and 702c.

As previously described and shown in FIGS. 5A and 5B, the orifice tube 210 has a flat side 500, a closed end 404, and an open end 406. The closed end 404 does not have to be circular in shape and can be mechanically crushed or crimped to seal the end 404. The orifice tube 210 also has a bend 408 proximate to the open end 406. The orifice tube 210 is typically made of stainless steel or other suitable material. Moreover, the orifice tube 210 does not have to have a substantially circular cross section as shown. Instead, the orifice tube 210 can have a rectangular, triangular, polygonal or other suitable cross section.

The orifice tubes 210 are attached to the outer surface 102a of the top foil 102 by blazing or resistive welding. The flat side 500 of the orifice tube 210 is the mating surface for attachment to the outer surface of the top foil sections 702a, 702b, and 702c. Holes are drilled through the inner surface of the top foil sections 702a, 702b, and 702c and the flat side 500 of the orifice tube 210 to form the top foil orifice holes 212 and orifice tube holes (not shown). The holes 212 can be drilled or EMD machined. Fabricating the holes 212 in this manner eliminates alignment problems associated with creating the top foil orifice holes 212 and orifice tubes holes (not shown) separately prior to assembly. As a result, each orifice tube hole (not shown) is substantially aligned with one of the top foil orifice holes 212. Moreover, each orifice tube 210 has a set 402 of top foil orifice holes 212 that includes at least three top foil orifice holes 212. Although any spacing or number of top foil orifice holes 212 can be used, three to eight top foil orifice holes 212 that are approximately equidistant from one another along a circumference of the circular-shaped top foil sections 702a, 702b, and 702c is preferred. The present invention is not limited to the specific orientation of the top foil orifice holes 212 to the orifice tubes 210 shown in FIG. 10B.

Bump foil strips 302 are attached (spot-welded or other suitable methods) to the outer surface of the top foil sections 702a, 702b, and 702c adjacent to each side of each orifice tube 210 along the axial direction. So, if there is one orifice tube 210, there will be two bump foil strips 302; if there are two orifice tubes 210, there will be three bump foil strips 302; if there are three orifice tubes 210, there will be four bump foil strips 302; and so on. Note that the shape of the bump foil strip 302 is not limited to that shown in the figures. Thereafter, the foil-tube assembly is formed into a substantially circular shape via hot forming using a pre-shaped jig. A circumferential groove 412 is formed on the inner surface of the housing 106 to receive each orifice tube 210. As shown in FIG. 10A, the foil-tube assembly is then inserted into the housing or bearing sleeve 106 such that the orifice tubes 210 rest in the circumferential grooves 412 and the open end 406 of the orifice tubes 210 extends through the housing openings 410 to form the HAFB3 1000. In another alternative embodiment, the circumferential grooves 412 can be eliminated as long as the height of the bumps on the bump foil strips 302 is sufficiently greater than the height of the orifice tubes 210 to prevent damage to the orifice tubes 210 and uneven wear on the top foil sections 702a, 702b, and 702c.

Referring now to FIG. 11, a flow chart illustrating the method of manufacturing the hybrid air foil bearing of FIGS. 10A and 10B in accordance with another embodiment of the present invention is shown. One or more the orifice tubes are provided in block 1102. Each orifice tube has a flat side, a closed end, an open end, and a bend proximate to the open end. At least three top foil sections are provided in block 1104, wherein each top foil section includes one or more recessed areas on the inner surface of the top foil sections. If desired, the optional step of applying a low friction coating on the interior of the top foil sections is shown in block 1106. A housing having an opening extending through the housing to receive the open end of each orifice tube is provided in block 1108. If desired, the optional step of forming a circumferential groove on the inner surface of the housing to receive each orifice tube is shown in block 1110. A foil-tube assembly is created in block 1112 by: (a) attaching the flat side of the orifice tube(s) to an outer surface of the top foil sections via blazing, resistive welding or other suitable methods; (b) creating a set of holes through the inner surface of the top foil proximate to the center of the recessed area and the flat side of the orifice tube via drilling or EMD machining to form a set of top foil orifice holes and corresponding orifice tube holes; and (c) attaching a bump foil strip to the outer surface of the top foil sections adjacent to each side of each orifice tube. The foil-tube assembly is formed into a substantially circular shape via hot forming using a pre-shaped jig in block 1114. The foil-tube assembly is then inserted into the housing such the open end of the orifice tubes extends through the housing openings in block 1116.

Additional three pad, channel tube configurations will now be described in reference to FIGS. 12-17 in accordance with the present invention. FIGS. 12-17 show various three pad (top foil) configurations, but these designs can be applied to a single top foil (full circle) design or a design having more or less than three pads.

Figure 12A:
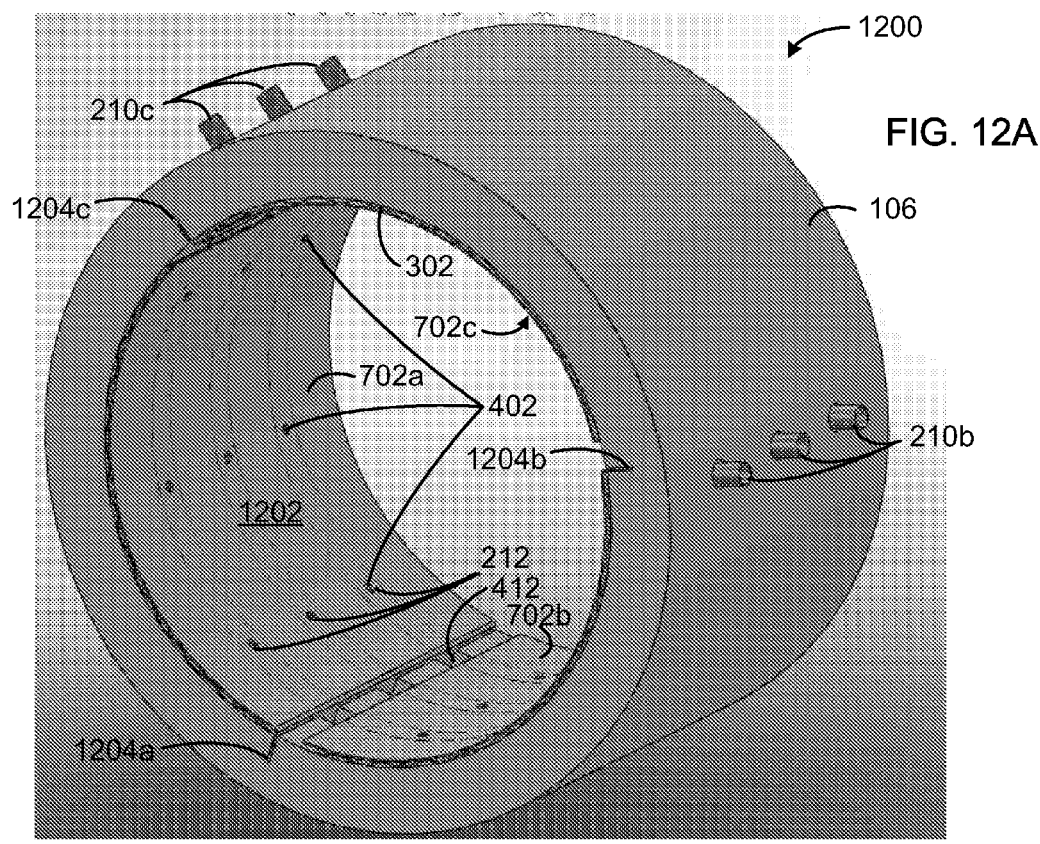
FIGS. 12A-12G depict various views of a hybrid air foil bearing (three pad configuration with open channel tubes along circumferential direction) in accordance with another embodiment of the present invention.
Figure 12B:
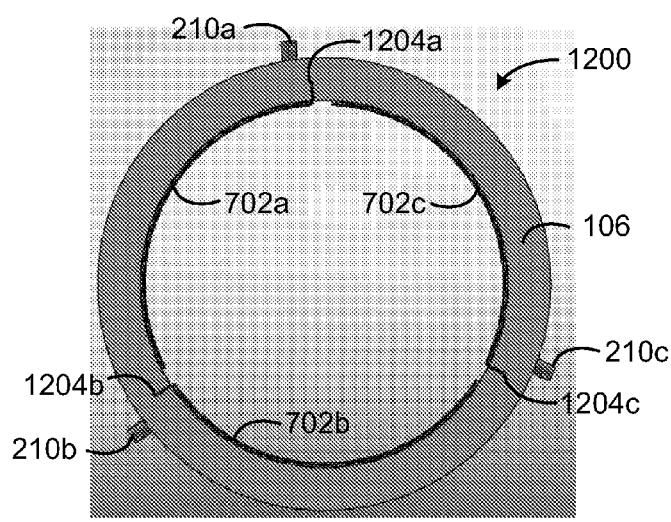

Now referring to FIGS. 12A-12G, various views of a hybrid air foil bearing 1200 (three pad configuration with open channel tubes along circumferential direction) for supporting a shaft, rotor or journal by an air layer formed between a substantially circular inner surface of a housing 106 and the shaft are depicted in accordance with another embodiment of the present invention. As shown in FIGS. 12A and 12B, the hybrid air foil bearing 1200 includes three top foil assemblies 1202 collectively formed into a substantially circular shape having one or more sets 402 of top foil orifice holes 212, wherein each set 402 of top foil orifice holes 212 includes one or more top foil orifice holes 212 that are spaced apart from one another along a circumference of the circular-shaped top foil assemblies 1202. As shown, the three top foil assemblies have top foil 702a, top foil 702b, and top foil 702c. The circular-shaped top foil assemblies 1202 may include more or less than three sections. Each top foil 702a, 702b, and 702c is attached to the housing 106 by affixing the top foil keys 1206a, 1206b, and 1206c (FIG. 12D) in the corresponding top foil key slots 1204a, 1204b, and 1204c. Note that top foils 702a, 702b, and 702c can be welded or otherwise attached directly to the interior of the housing 106, thus eliminating the need for the top foil keys 1206 and top foil slots 1204. As shown, the top foil orifice holes 212 are aligned axially and circumferentially in the top foils 702a, 702b, and 702c. Nine top foil orifice holes (3×3 array) are provided per top foil 702a, 702b, and 702c. The present invention is not limited to this orientation. Each set 402 of top foil orifice holes 212 has a corresponding orifice tube (hydrostatic air line) 210 that extends through housing openings 410 to facilitate connections to external hydrostatic air supply lines.

Figure 12C:
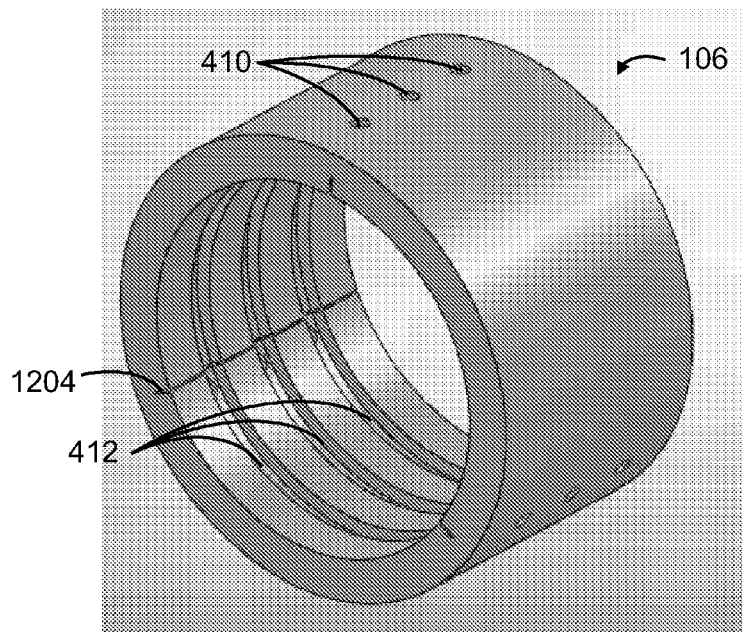
Figure 12D:
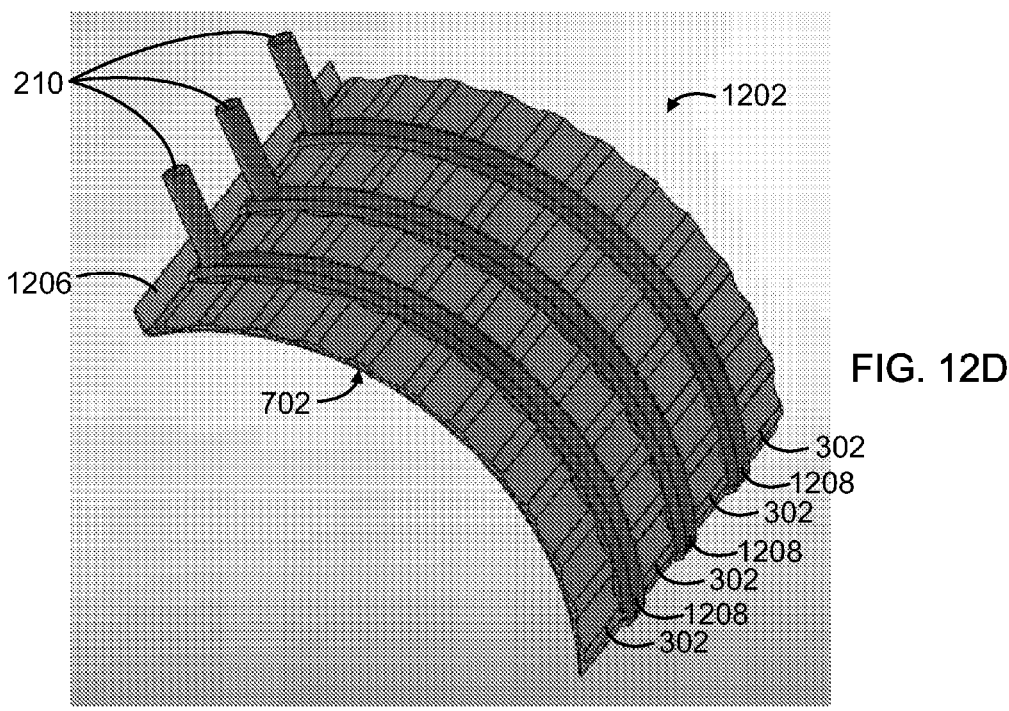
Figure 12E:
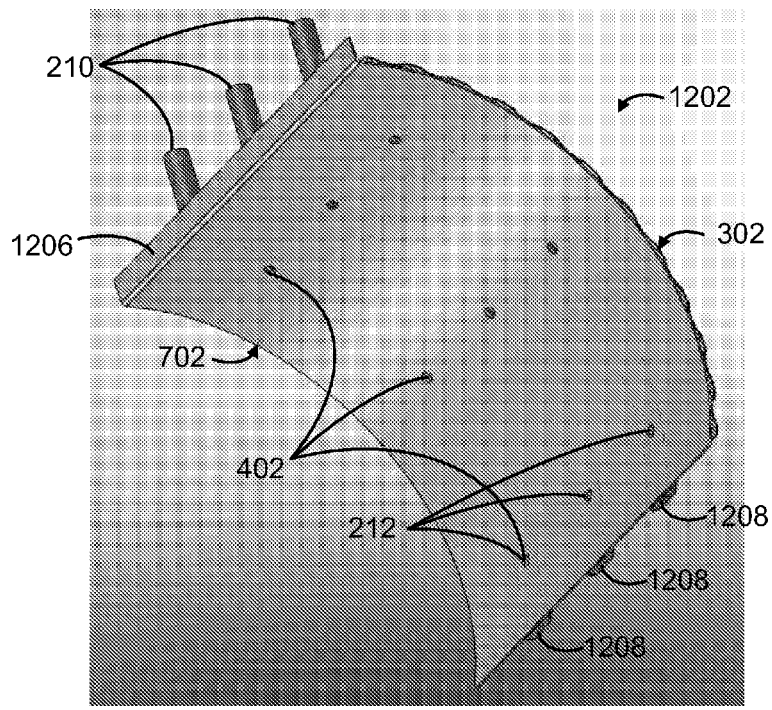
Figure 12F:
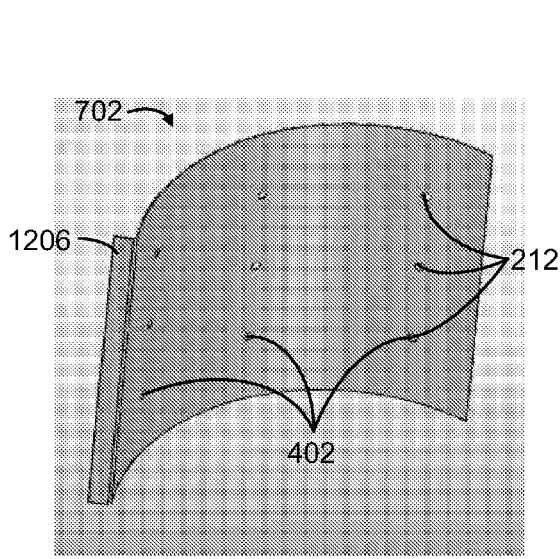
Figure 12G:
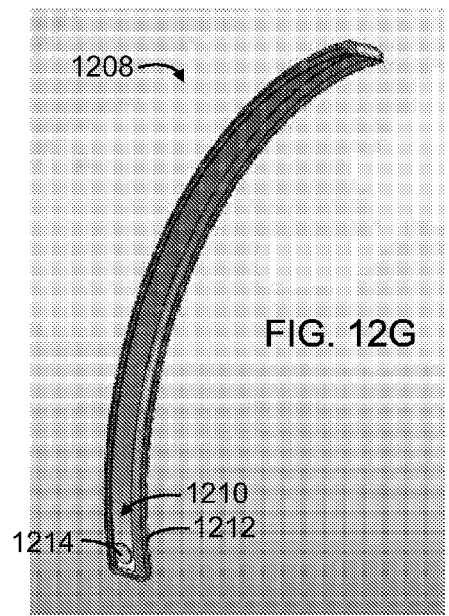

As shown in FIGS. 12C, 12D and 12G, circumferential grooves 412 are formed on the inner surface of the housing 106 to receive the open section channels 1208 for each orifice tube 210. Note that housing openings 410 extend into the circumferential grooves 412. As shown in FIGS. 12D-12G, each top foil assembly 1202 includes a curved top foil 702 having a top foil key 1206. As previously noted, the top foil key 1206 is not necessary if the top foil 702 is welded or otherwise attached directly to the interior surface of the housing 106. An open section channel 1208 is aligned with each set 402 of top foil orifice holes 212 to cover the top foil orifice holes 212 and is affixed to the outer surface of the top foil 702 (e.g., welded, etc.). Each open section channel 1208 includes walls 1212 that enclose the top foil orifice holes 212 within the channel 1210. An orifice tube 210 is attached to the open section channel 1208 via channel orifice 1214 located at one end of the channel 1210. A bump foil strip 302 is attached to the outer surface of the top foil 702 adjacent to open section channel 1208. So, if there is one open section channel 1208, there will be two bump foil strips 302; if there are two open section channels 1208, there will be three bump foil strips 302; if there are three open section channels 1208, there will be four bump foil strips 302; and so on. Note that the shape of the bump foil strip 302 is not limited to that shown in the figures. The top foil 702 and the bump foil strips 302 are typically made from a nickel-based alloy (e.g., an inconel material), which has high thermal stability and elastic limit. Other materials can be used if they satisfy the operating requirements. This design allows easy forming of circular orifice tubes because the channel 1210 has open cross section. Channels 1210 are made through deep drawing or stamping. Top foil orifice holes 212 are formed before welding the open section channels 1208.

In an alternative embodiment a low friction coating having heat and abrasion resistance can be added to the interior of the top foil 702. Some examples of these low friction coatings are described in U.S. Patent Application Publication Nos. 2007/0003693 and 2008/00572223 which are hereby incorporated by reference. In another alternative embodiment, the circumferential grooves 412 can be eliminated as long as the height of the bumps on the bump foil strips 302 is sufficiently greater than the height of the open section channels 1208.

Referring now to FIG. 13, a flow chart illustrating the method of manufacturing the hybrid air foil bearing of FIGS. 12A-12G in accordance with another embodiment of the present invention is shown. One or more top foils (e.g., three), one or more open section channels (e.g., three) for each top foil, and an orifice tube for each open section channel are all provided in block 1302. If desired, one or more recessed areas can be formed on the inner surface of each top foil in the optional step in block 1304. If desired, a low friction coating can be applied on the interior of the top foil in the optional step in block 1106. A housing having an opening extending through the housing to receive each orifice tube is provided in block 1108. If desired, a circumferential groove can be formed on the inner surface of the housing to receive each open section channel in the optional step in block 1110. One or more top foil assemblies are created in block 1306 by: (a) creating a set of holes through the top foil for each open section channel via drilling or EMD machining to form a set of top foil orifice holes; (b) attaching the open channel portion of an open section channel to the outer surface of the top foil via blazing, resistive welding or other suitable methods to cover each set of tope foil orifice holes; (c) attaching an orifice tube to each open section channel via the channel orifice (note that this step can be performed after block 1308); and (d) attaching a bump foil strip to the outer surface of the top foil adjacent to each side of each open section channel. Each top foil assembly is formed into a substantially semi-circular shape in block 1308. Each top foil assembly is then inserted into the housing such the open end of the orifice tubes extends through the housing openings in block 1310.

Figure 14A:
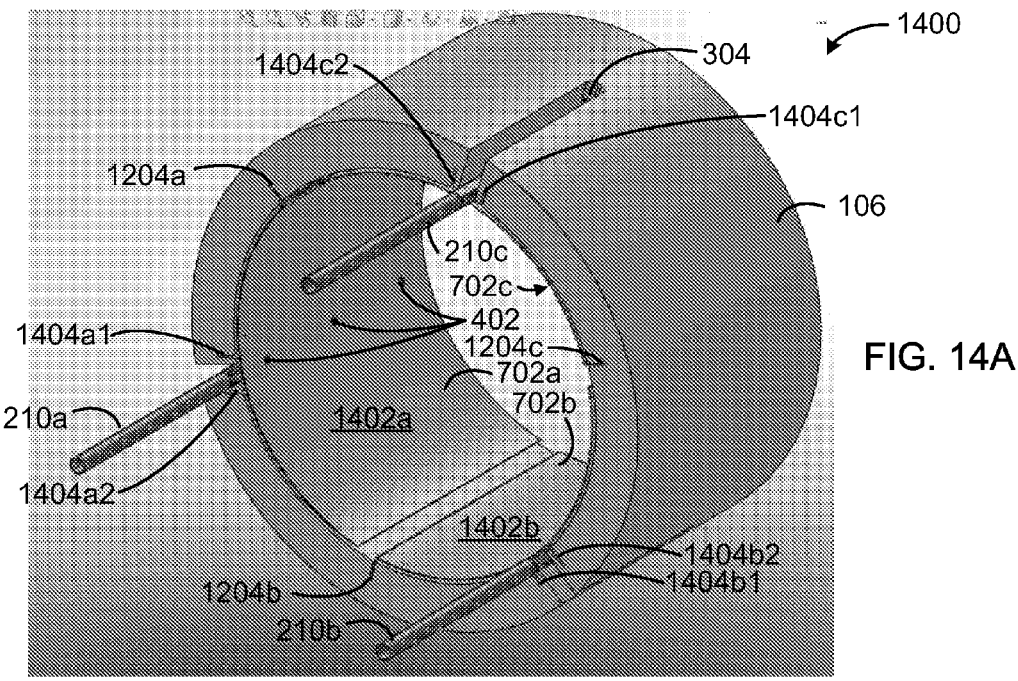
FIGS. 14A-14B depict various views of a hybrid air foil bearing (three pad configuration with axial orifice attached to the top foil) in accordance with another embodiment of the present invention.
Figure 14B:
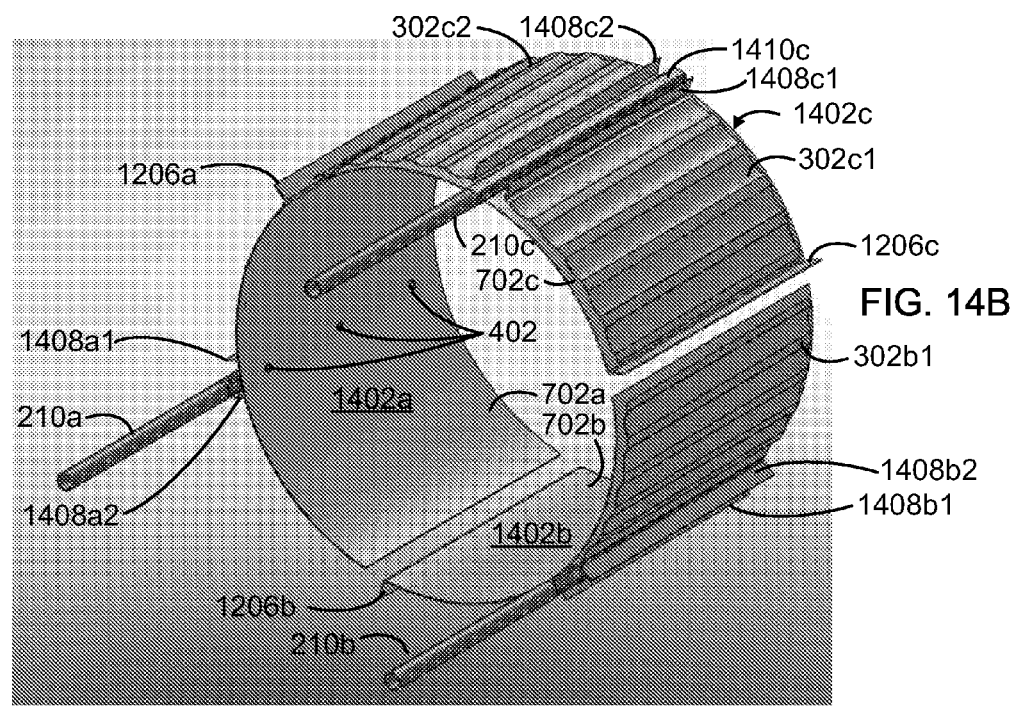

Referring now to FIGS. 14A-14B, various views of a hybrid air foil bearing (three pad configuration with axial orifice attached to the top foil) for supporting a shaft, rotor or journal by an air layer formed between a substantially circular inner surface of a housing 106 and the shaft are depicted in accordance with another embodiment of the present invention. As shown, the hybrid air foil bearing 1400 includes three top foil assemblies 1402 collectively formed into a substantially circular shape. Each top foil assembly 1402a, 1402b and 1402c has a set 402 of axially aligned top foil orifice holes 212 in the top foil 702a, 702b, and 702c, respectively. The circular-shaped top foil assemblies 1402 may include more or less than three sections. Each top foil 702a, 702b, and 702c is attached to the housing 106 by affixing the top foil keys 1206a, 1206b, and 1206c in the corresponding top foil key slots 1204a, 1204b, and 1204c. Note that top foils 702a, 702b, and 702c can be welded or otherwise attached directly to the interior of the housing 106, thus eliminating the need for the top foil keys 1206 and top foil slots 1204. Each set 402 of top foil orifice holes 212 has a corresponding orifice tube (hydrostatic air line) 210 that extends through open slots 304 in the housing 106 to facilitate connections to external hydrostatic air supply lines.

Each top foil assembly 1402 includes a curved top foil 702 having a top foil key 1206. As previously noted, the top foil key 1206 is not necessary if the top foil 702 is welded or otherwise attached directly to the interior surface of the housing 106. Each orifice tube 210 has a rectangular portion, flat portion or channel 1410 that is aligned with each set 402 of top foil orifice holes 212 to cover the top foil orifice holes 212 and is affixed to the outer surface of the top foil 702 (e.g., welded, brazed, etc.). Note that the top foil orifice holes 212 are machined from the inner side of top foil 702 after attaching the orifice tubes 210 to the top foil 702. With respect to top foil assembly 1402c, a bump foil 302c1 and 302c2 is attached to the housing 106 proximate to each side of the flat portion or channel 1410c of the orifice tube 210c by affixing the bump foil keys 1408c1 and 1408c2 in the corresponding bump foil key slots 1404c1 and 1404c2. This is repeated for the other top foil assemblies 1402a and 1402b. Note that top foils 702a, 702b, 702c and bump foils 302a1, 302a2, 302b1, 302b2, 302c1, 302c2 can be welded or otherwise attached directly to the interior of the housing 106, thus eliminating the need for the top foil keys 1206 and top foil slots 1204. Alternatively, bump foils 302a1, 302a2, 302b1, 302b2, 302c1, 302c2 can be welded or otherwise attached directly to the outer surface of top foils 702a, 702b and 702c. The top foil 702 and the bump foil strips 302 are typically made from a nickel-based alloy (e.g., an inconel material), which has high thermal stability and elastic limit. Other materials can be used if they satisfy the operating requirements.

In an alternative embodiment a low friction coating having heat and abrasion resistance can be added to the interior of the top foil 702. Some examples of these low friction coatings are described in U.S. Patent Application Publication Nos. 2007/0003693 and 2008/00572223 which are hereby incorporated by reference.

Figure 15:
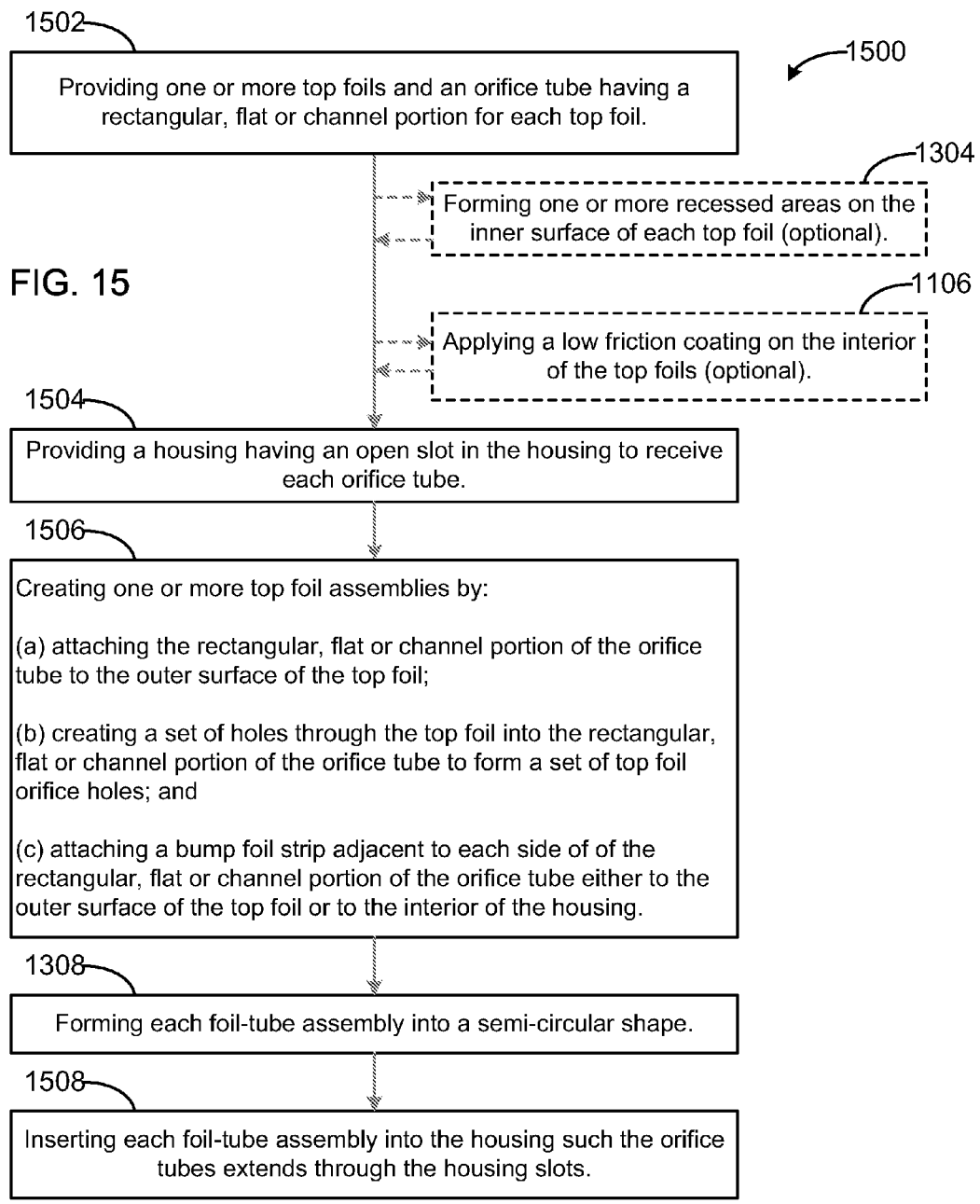
FIG. 15 is a flow chart illustrating the method of manufacturing the hybrid air foil bearing of FIGS. 14A-14B in accordance with another embodiment of the present invention.

Referring now to FIG. 15, a flow chart illustrating the method of manufacturing the hybrid air foil bearing of FIGS. 14A-14B in accordance with another embodiment of the present invention is shown. One or more top foils (e.g., three) and an orifice tube having a rectangular, flat or channel portion for each top foil are provided in block 1502. If desired, one or more recessed areas can be formed on the inner surface of each top foil in the optional step in block 1304. If desired, a low friction coating can be applied on the interior of the top foil in the optional step in block 1106. A housing having an open slot in the housing to receive each orifice tube is provided in block 1504. One or more top foil assemblies are created in block 1506 by: (a) attaching the rectangular, flat or open channel portion of the orifice tube to the outer surface of the top foil via blazing, resistive welding or other suitable methods; (b) creating a set of holes through the top foil into the rectangular, flat or channel portion of the orifice tube via drilling or EMD machining to form a set of top foil orifice holes; and (c) attaching a bump foil strip adjacent or proximate to each side of the rectangular, flat or channel portion of the orifice tube either to the outer surface of the top foil or to the interior of the housing. Each top foil assembly is formed into a substantially semi-circular shape in block 1308. Each top foil assembly is then inserted into the housing such the orifice tubes extend through the housing slots in block 1508.

Now referring to FIGS. 16A-16E, various views of a hybrid air foil bearing (three pad configuration with axial channel) for supporting a shaft, rotor or journal by an air layer formed between a substantially circular inner surface of a housing 106 and the shaft are depicted in accordance with another embodiment of the present invention. As shown, the hybrid air foil bearing 1600 includes three top foil assemblies 1602 collectively formed into a substantially circular shape. Each top foil assembly 1602a, 1602b and 1602c has a set 402 of axially aligned top foil orifice holes 212 in the top foil 702a, 702b, and 702c, respectively. The circular-shaped top foil assemblies 1602 may include more or less than three sections. Each top foil 702a, 702b, and 702c is attached to the housing 106 by affixing the top foil keys 1206a, 1206b, and 1206c in the corresponding top foil key slots 1204a, 1204b, and 1204c. Note that top foils 702a, 702b, and 702c can be welded or otherwise attached directly to the interior of the housing 106, thus eliminating the need for the top foil keys 1206 and top foil slots 1204. Each set 402 of top foil orifice holes 212 has a corresponding L-shaped orifice tube (hydrostatic air line) 210 that extends through open slots 304 in the housing 106 to facilitate connections to external hydrostatic air supply lines.

Each top foil assembly 1602 includes a curved top foil 702 having a top foil key 1206. As previously noted, the top foil key 1206 is not necessary if the top foil 702 is welded or otherwise attached directly to the interior surface of the housing 106. Each L-shaped orifice tube 210 has a curved end 1606 that connects to a open section channel 1604 aligned with each set 402 of top foil orifice holes 212 to cover the top foil orifice holes 212. The open section channel 1604 is affixed to the outer surface of the top foil 702 (e.g., welded, brazed, etc.). Each open section channel 1604 includes walls 1212 that enclose the top foil orifice holes 212 within the channel 1210 and can be manufactured by stamping or deep drawing. The curved end 1606 of the orifice tube 210 is attached to the open section channel 1604 via channel orifice 1608 located in the approximate center of the channel 1210. With respect to top foil assembly 1602c, a bump foil 302c1 and 302c2 is attached to the housing 106 proximate to each side of the open section channel 1604c by affixing the bump foil keys 1408c1 and 1408c2 in the corresponding bump foil key slots 1404c1 and 1404c2. This is repeated for the other top foil assemblies 1602a and 1602b. Note that top foils 702a, 702b, 702c and bump foils 302a1, 302a2, 302b1, 302b2, 302c1, 302c2 can be welded or otherwise attached directly to the interior of the housing 106, thus eliminating the need for the top foil keys 1206 and top foil slots 1204. Alternatively, bump foils 302a1, 302a2, 302b1, 302b2, 302c1, 302c2 can be welded or otherwise attached directly to the outer surface of top foils 702a, 702b and 702c. The top foil 702 and the bump foil strips 302 are typically made from a nickel-based alloy (e.g., an inconel material), which has high thermal stability and elastic limit. Other materials can be used if they satisfy the operating requirements.

In an alternative embodiment a low friction coating having heat and abrasion resistance can be added to the interior of the top foil 702. Some examples of these low friction coatings are described in U.S. Patent Application Publication Nos. 2007/0003693 and 2008/00572223 which are hereby incorporated by reference.

Figure 16A:
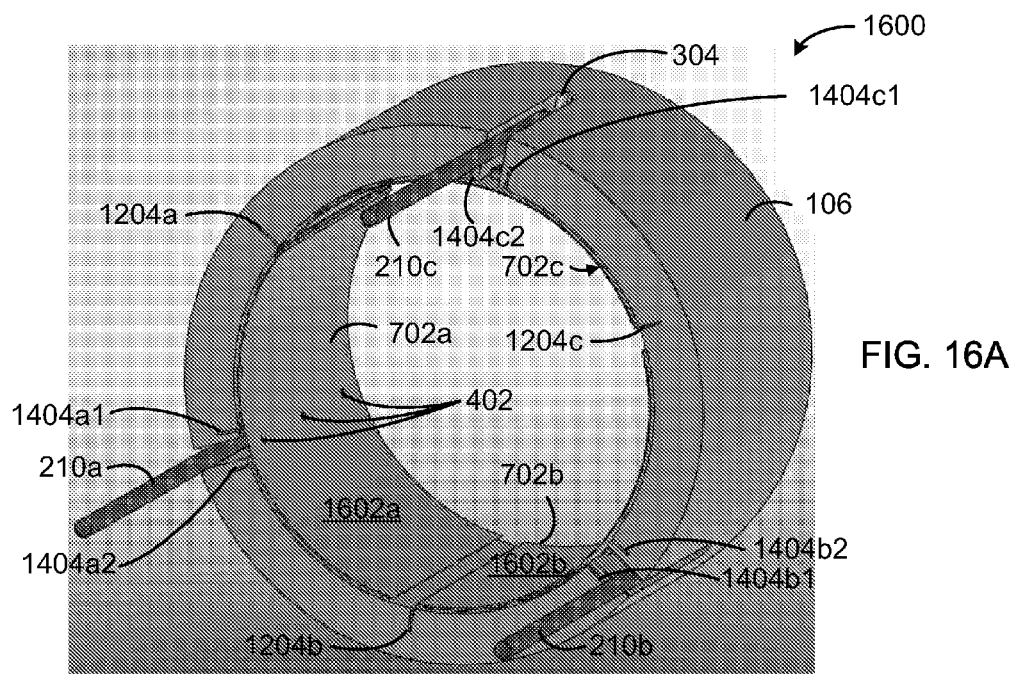
Figure 16B:
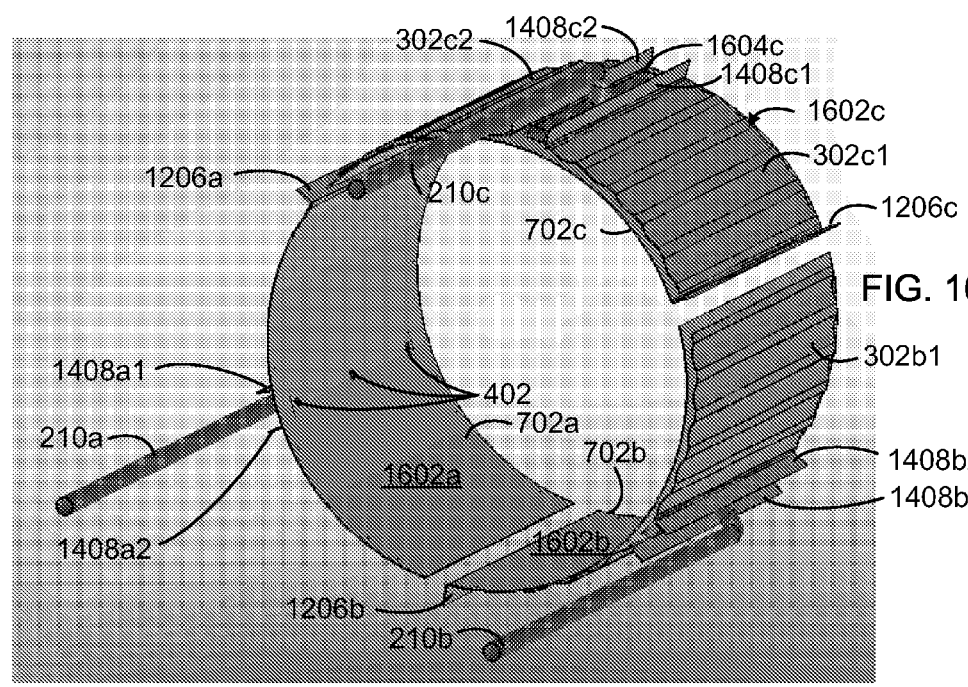

Referring now to FIG. 17, a flow chart illustrating the method of manufacturing the hybrid air foil bearing of FIGS. 16A-16B in accordance with another embodiment of the present invention is shown. One or more top foils (e.g., three), one or more open section channels (e.g., three) for each top foil, and a L-shaped orifice tube for each open section channel are all provided in block 1702. If desired, one or more recessed areas can be formed on the inner surface of each top foil in the optional step in block 1304. If desired, a low friction coating can be applied on the interior of the top foil in the optional step in block 1106. A housing having an open slot in the housing to receive each orifice tube is provided in block 1504. One or more top foil assemblies are created in block 1704 by: (a) creating a set of holes through the top foil for each open section channel via drilling or EMD machining to form a set of top foil orifice holes; (b) attaching the open channel portion of an open section channel to the outer surface of the top foil via blazing, resistive welding or other suitable methods to cover each set of tope foil orifice holes; (c) attaching the curved end of the orifice tube to each open section channel via the channel orifice (note that this step can be performed after block 1308); and (d) attaching a bump foil strip adjacent or proximate to each open section channel either to the outer surface of the top foil or to the interior of the housing. Each top foil assembly is formed into a substantially semi-circular shape in block 1308. Each top foil assembly is then inserted into the housing such the orifice tubes extend through the housing slots in block 1508.

Figure 18A:
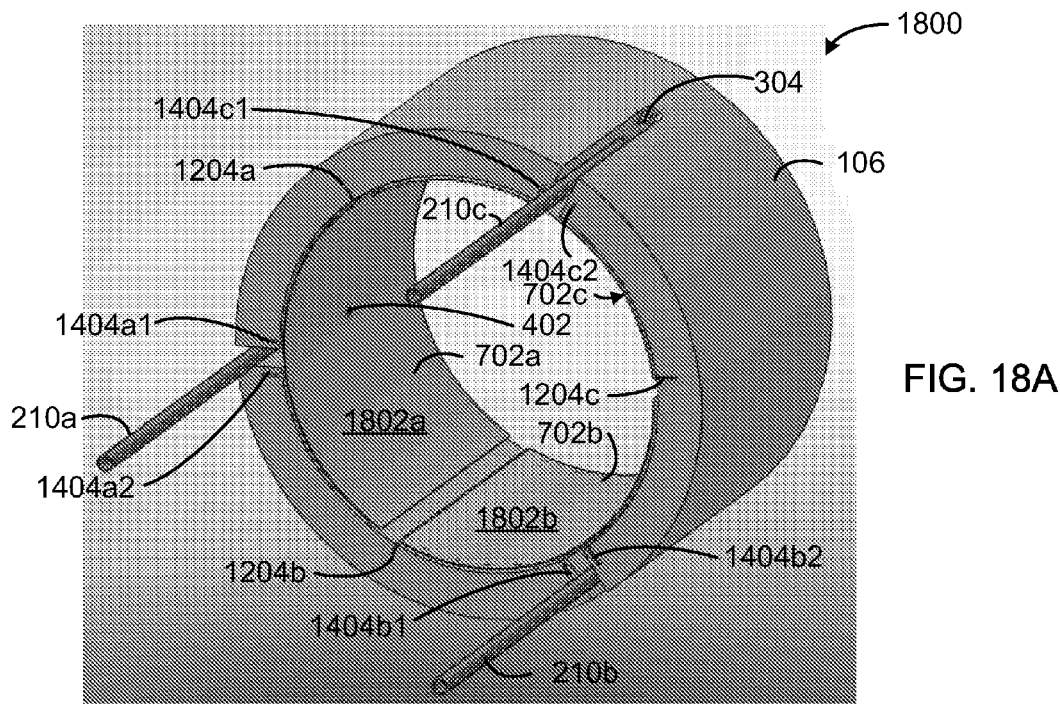
FIGS. 18A-18B depict various views of a hybrid air foil bearing (three pad configuration with tubes attached to center of the top foil) in accordance with another embodiment of the present invention.
Figure 18B:
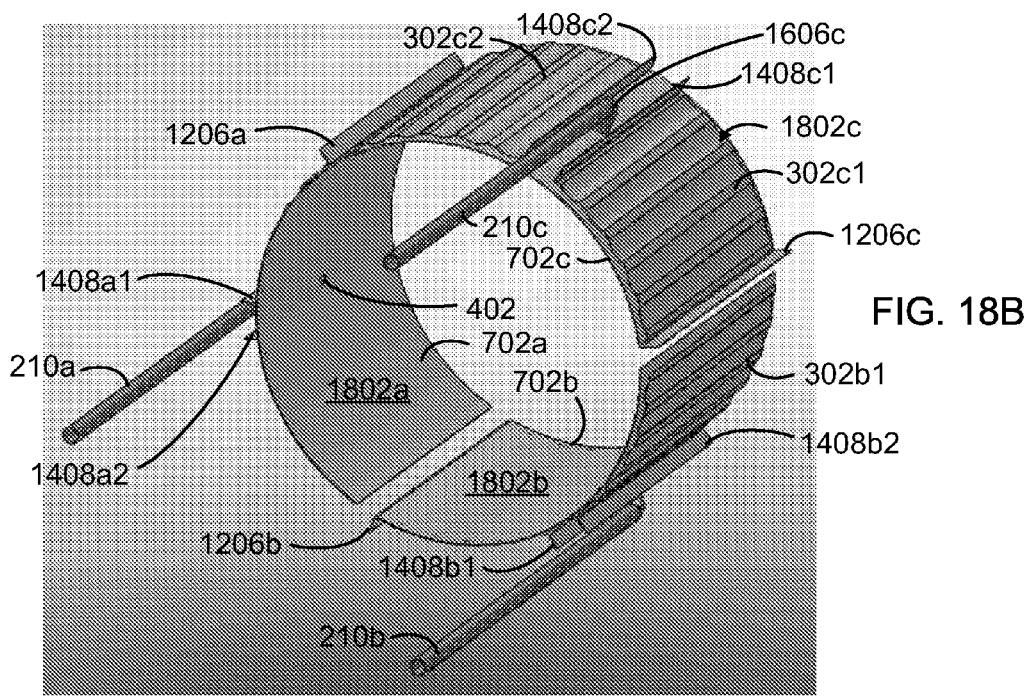

Referring now to FIGS. 18A-18B, various views of a hybrid air foil bearing (three pad configuration with tubes attached to center of the top foil) for supporting a shaft, rotor or journal by an air layer formed between a substantially circular inner surface of a housing 106 and the shaft are depicted in accordance with another embodiment of the present invention. As shown, the hybrid air foil bearing 1800 includes three top foil assemblies 1802 collectively formed into a substantially circular shape. Each top foil assembly 1802a, 1802b and 1802c has an orifice hole 212 in the top foil 702a, 702b, and 702c, respectively. The circular-shaped top foil assemblies 1802 may include more or less than three sections. Each top foil 702a, 702b, and 702c is attached to the housing 106 by affixing the top foil keys 1206a, 1206b, and 1206c in the corresponding top foil key slots 1204a, 1204b, and 1204c. Note that top foils 702a, 702b, and 702c can be welded or otherwise attached directly to the interior of the housing 106, thus eliminating the need for the top foil keys 1206 and top foil slots 1204. Each orifice hole 212 has a corresponding L-shaped orifice tube (hydrostatic air line) 210 that extends through open slots 304 in the housing 106 to facilitate connections to external hydrostatic air supply lines.

Each top foil assembly 1802 includes a curved top foil 702 having a top foil key 1206. As previously noted, the top foil key 1206 is not necessary if the top foil 702 is welded or otherwise attached directly to the interior surface of the housing 106. Each L-shaped orifice tube 210 has a curved end 1606 that connects to the top foil orifice hole 212. The curved end 1606 of the orifice tube 210 is attached to the top foil 702 at the orifice hole 212. With respect to top foil assembly 1602c, a bump foil 302c1 and 302c2 is attached to the housing 106 proximate to each side of the orifice tube 210c by affixing the bump foil keys 1408c1 and 1408c2 in the corresponding bump foil key slots 1404c1 and 1404c2. This is repeated for the other top foil assemblies 1602a and 1602b. Note that top foils 702a, 702b, 702c and bump foils 302a1, 302a2, 302b1, 302b2, 302c1, 302c2 can be welded or otherwise attached directly to the interior of the housing 106, thus eliminating the need for the top foil keys 1206 and top foil slots 1204. Alternatively, bump foils 302a1, 302a2, 302b1, 302b2, 302c1, 302c2 can be welded or otherwise attached directly to the outer surface of top foils 702a, 702b and 702c. The top foil 702 and the bump foil strips 302 are typically made from a nickel-based alloy (e.g., an inconel material), which has high thermal stability and elastic limit. Other materials can be used if they satisfy the operating requirements.

In an alternative embodiment a low friction coating having heat and abrasion resistance can be added to the interior of the top foil 702. Some examples of these low friction coatings are described in U.S. Patent Application Publication Nos. 2007/0003693 and 2008/00572223 which are hereby incorporated by reference.

Figure 19:
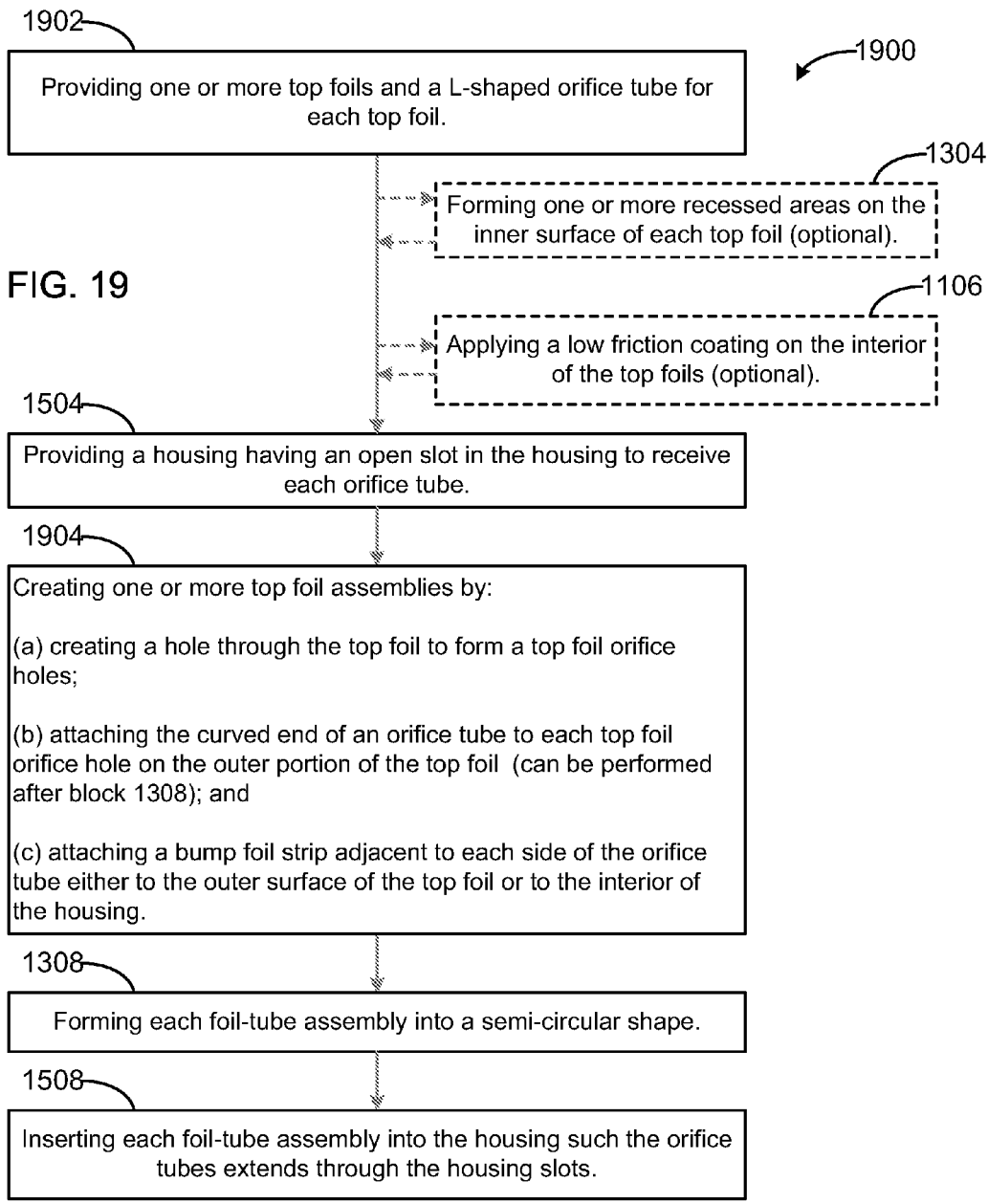
FIG. 19 is a flow chart illustrating the method of manufacturing the hybrid air foil bearing of FIGS. 18A-18B in accordance with another embodiment of the present invention.

Referring now to FIG. 19, a flow chart illustrating the method of manufacturing the hybrid air foil bearing of FIGS. 18A-18B in accordance with another embodiment of the present invention is shown. One or more top foils (e.g., three) and a L-shaped orifice tube for each top foil are provided in block 1902. If desired, one or more recessed areas can be formed on the inner surface of each top foil in the optional step in block 1304. If desired, a low friction coating can be applied on the interior of the top foil in the optional step in block 1106. A housing having an open slot in the housing to receive each orifice tube is provided in block 1504. One or more top foil assemblies are created in block 1904 by: (a) creating a hole through the top foil via drilling or EMD machining to form a top foil orifice hole; (b) attaching the curved end of the orifice tube to each top foil orifice on the outer portion of the top foil (note that this step can be performed after block 1308); and (c) attaching a bump foil strip adjacent or proximate to each side of the orifice tube either to the outer surface of the top foil or to the interior of the housing. Each top foil assembly is formed into a substantially semi-circular shape in block 1308. Each top foil assembly is then inserted into the housing such the orifice tubes extend through the housing slots in block 1508.

Figures 20A, 20B, 20C:
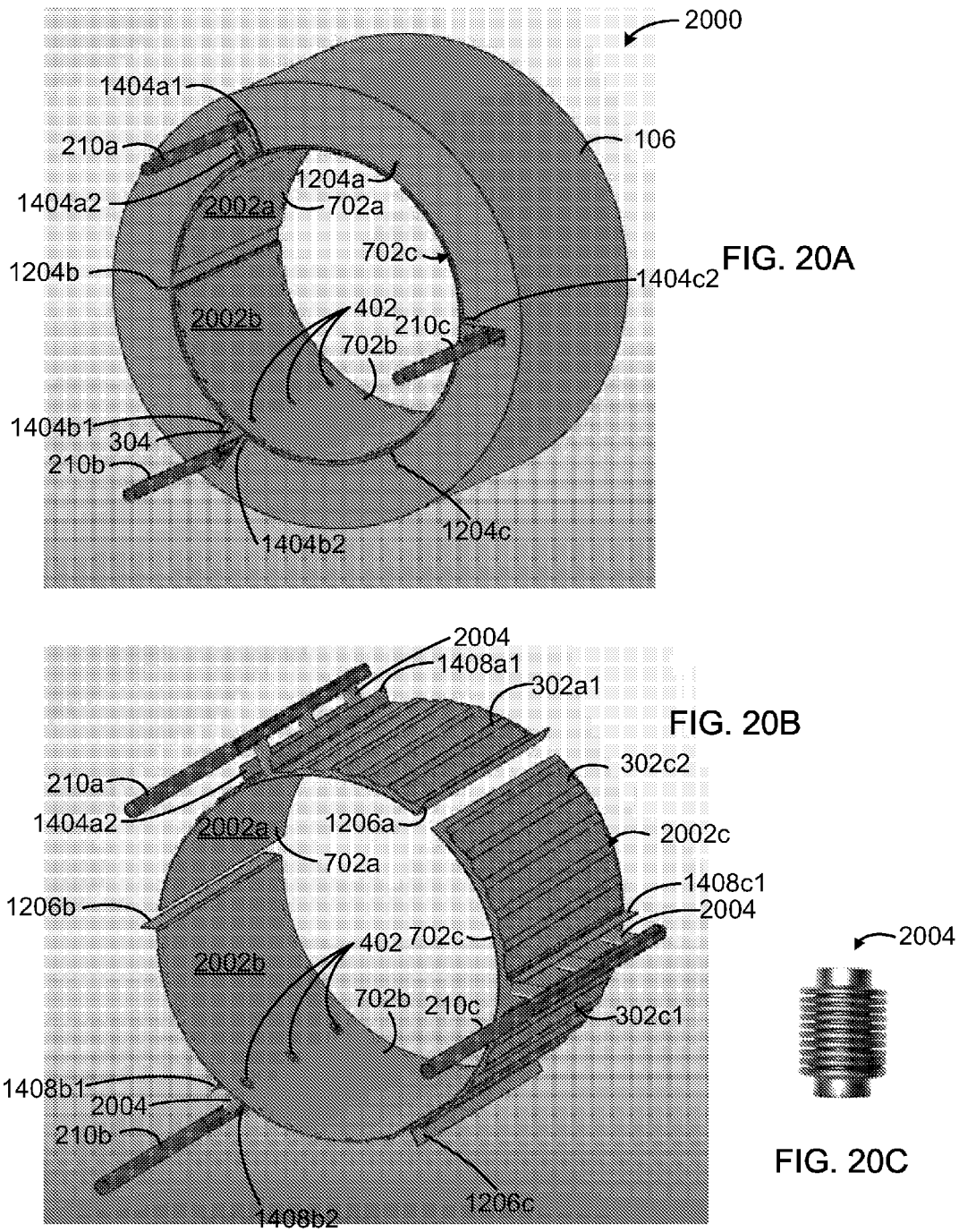
FIGS. 20A-20C depict various views of a hybrid air foil bearing (three pad configuration with axial tubes and bellows) in accordance with another embodiment of the present invention.

Now referring to FIGS. 20A-20C, various views of a hybrid air foil bearing (three pad configuration with axial tubes and bellows) for supporting a shaft, rotor or journal by an air layer formed between a substantially circular inner surface of a housing 106 and the shaft are depicted in accordance with another embodiment of the present invention. As shown, the hybrid air foil bearing 2000 includes three top foil assemblies 2002 collectively formed into a substantially circular shape. Each top foil assembly 2002a, 2002b and 2002c has a set 402 of axially aligned top foil orifice holes 212 in the top foil 702a, 702b, and 702c, respectively. The circular-shaped top foil assemblies 2002 may include more or less than three sections. Each top foil 702a, 702b, and 702c is attached to the housing 106 by affixing the top foil keys 1206a, 1206b, and 1206c in the corresponding top foil key slots 1204a, 1204b, and 1204c. Note that top foils 702a, 702b, and 702c can be welded or otherwise attached directly to the interior of the housing 106, thus eliminating the need for the top foil keys 1206 and top foil slots 1204. Each set 402 of top foil orifice holes 212 is connected to a corresponding orifice tube (hydrostatic air line) 210 via bellows 2004. By using the bellows 2004 or similar device, the orifice tube 210 can be rigid and extends through open slots 304 in the housing 106 to facilitate connections to external hydrostatic air supply lines. As shown, the orifice tube 210 rectangular or flat portion that facilitates the connection to the bellows 2004.

Each top foil assembly 1402 includes a curved top foil 702 having a top foil key 1206. As previously noted, the top foil key 1206 is not necessary if the top foil 702 is welded or otherwise attached directly to the interior surface of the housing 106. Each orifice tube 210 has a rectangular portion or flat portion that is aligned with and connects to each set 402 of top foil orifice holes 212 via bellows 2004 (e.g., welded, brazed, etc.). With respect to top foil assembly 1402c, a bump foil 302c1 and 302c2 is attached to the housing 106 adjacent or proximate to each side of the bellows 2004 and the rectangular portion or flat portion of the orifice tube 210c by affixing the bump foil keys 1408c1 and 1408c2 in the corresponding bump foil key slots 1404c1 and 1404c2. This is repeated for the other top foil assemblies 1402a and 1402b. Note that top foils 702a, 702b, 702c and bump foils 302a1, 302a2, 302b1, 302b2, 302c1, 302c2 can be welded or otherwise attached directly to the interior of the housing 106, thus eliminating the need for the top foil keys 1206 and top foil slots 1204. Alternatively, bump foils 302a1, 302a2, 302b1, 302b2, 302c1, 302c2 can be welded or otherwise attached directly to the outer surface of top foils 702a, 702b and 702c. The top foil 702 and the bump foil strips 302 are typically made from a nickel-based alloy (e.g., an inconel material), which has high thermal stability and elastic limit. Other materials can be used if they satisfy the operating requirements.

In an alternative embodiment a low friction coating having heat and abrasion resistance can be added to the interior of the top foil 702. Some examples of these low friction coatings are described in U.S. Patent Application Publication Nos. 2007/0003693 and 2008/00572223 which are hereby incorporated by reference.

Referring now to FIG. 21, a flow chart illustrating the method of manufacturing the hybrid air foil bearing of FIGS. 20A-14C in accordance with another embodiment of the present invention is shown. One or more top foils (e.g., three) and an orifice tube having a rectangular or flat portion for each top foil are provided in block 2102. If desired, one or more recessed areas can be formed on the inner surface of each top foil in the optional step in block 1304. If desired, a low friction coating can be applied on the interior of the top foil in the optional step in block 1106. A housing having an open slot in the housing to receive each orifice tube is provided in block 1504. One or more top foil assemblies are created in block 2104 by: (a) creating a set of holes through the top foil into the rectangular, flat or channel portion of the orifice tube via drilling or EMD machining to form a set of top foil orifice holes; (b) attaching a bellows to each top foil orifice hole; (c) attaching the rectangular or flat portion of the orifice tube to the bellows such that the bellows are aligned with holes in the rectangular or flat portion of the orifice tube; and (d) attaching a bump foil strip adjacent or proximate to each side of the rectangular or flat portion of the orifice tube and bellows either to the outer surface of the top foil or to the interior of the housing. Each top foil assembly is formed into a substantially semi-circular shape in block 1308. Each top foil assembly is then inserted into the housing such the orifice tubes extend through the housing slots in block 1508.

Figure 22A:
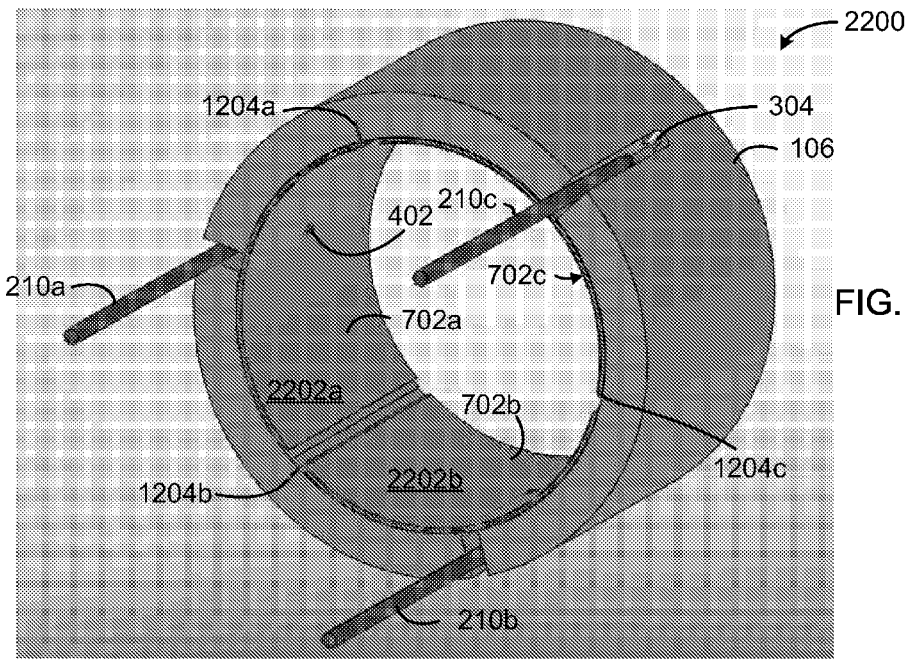
FIGS. 22A-22C depict various views of a hybrid air foil bearing (three pad configuration with third layer) in accordance with another embodiment of the present invention.
Figure 22B:
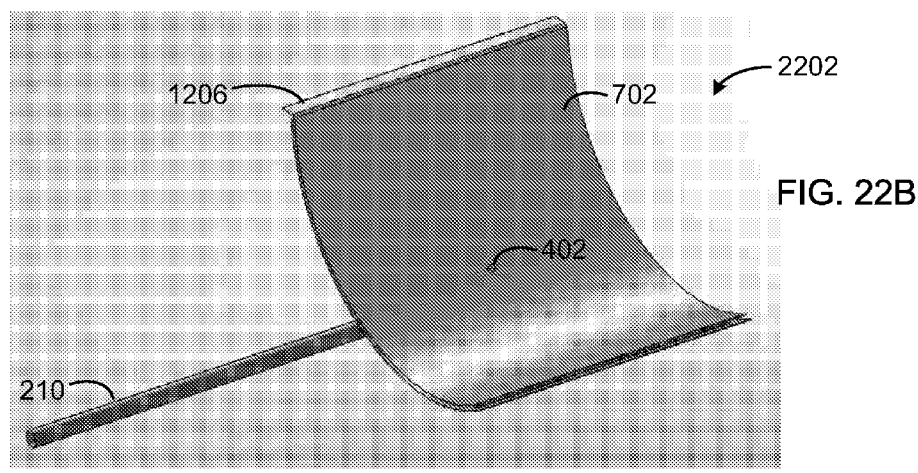
Figure 22C:
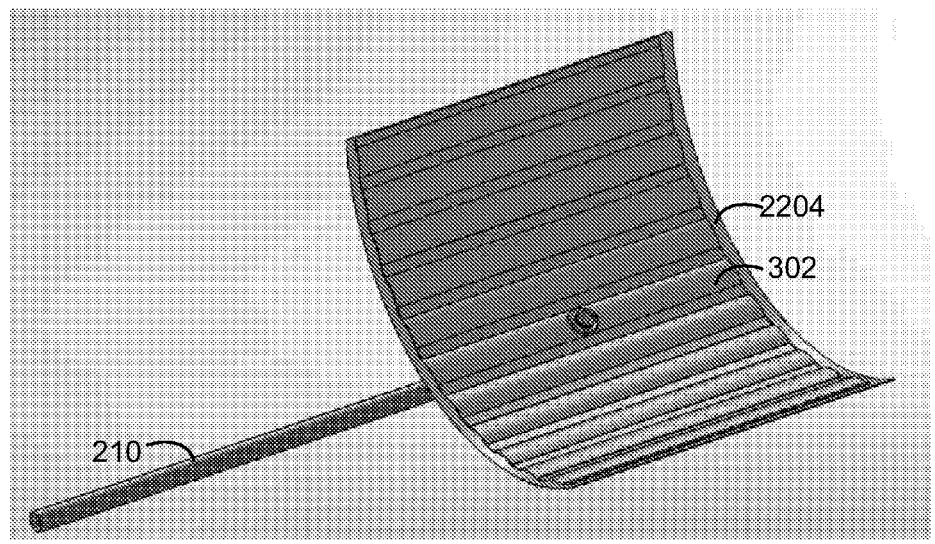

Referring now to FIGS. 22A-22C, various views of a hybrid air foil bearing (three pad configuration with third layer) for supporting a shaft, rotor or journal by an air layer formed between a substantially circular inner surface of a housing 106 and the shaft are depicted in accordance with another embodiment of the present invention. As shown, the hybrid air foil bearing 2200 includes three top foil assemblies 2202 collectively formed into a substantially circular shape. Each top foil assembly 2202a, 2202b and 2202c has an orifice hole 212 in the top foil 702a, 702b, and 702c, respectively. The circular-shaped top foil assemblies 2202 may include more or less than three sections. Each top foil 702a, 702b, and 702c is attached to the housing 106 by affixing the top foil keys 1206a, 1206b, and 1206c in the corresponding top foil key slots 1204a, 1204b, and 1204c. Note that top foils 702a, 702b, and 702c can be welded or otherwise attached directly to the interior of the housing 106, thus eliminating the need for the top foil keys 1206 and top foil slots 1204. Each orifice hole 212 has a corresponding L-shaped orifice tube (hydrostatic air line) 210 that extends through open slots 304 in the housing 106 to facilitate connections to external hydrostatic air supply lines. This design (with L-shaped tubes) has no bump support along the tubes. To allow uniform elastic support to the top foil, additional base layer is implemented and bump foils are now continuous along the circumferential direction Each top foil assembly 2202 includes a curved top foil 702 having a top foil key 1206. As previously noted, the top foil key 1206 is not necessary if the top foil 702 is welded or otherwise attached directly to the interior surface of the housing 106. Each L-shaped orifice tube 210 has a curved end 1606 that connects to the top foil orifice hole 212. The curved end 1606 of the orifice tube 210 is attached to the top foil 702 at the orifice hole 212. With respect to top foil assembly 2202, a bump foil 302 is disposed between a third foil or layer 2204 and the top foil 702. The third layer 2204 and the bump foil 302 have holes that allow the curved end of the orifice tube 210 to pass through and connect to the top foil 702. Note that top foils 702a, 702b, 702c can be welded or otherwise attached directly to the interior of the housing 106, thus eliminating the need for the top foil keys 1206 and top foil slots 1204. The top foil 702, the bump foil 302 and third layer 2204 are typically made from a nickel-based alloy (e.g., an inconel material), which has high thermal stability and elastic limit. Other materials can be used if they satisfy the operating requirements.

In an alternative embodiment a low friction coating having heat and abrasion resistance can be added to the interior of the top foil 702. Some examples of these low friction coatings are described in U.S. Patent Application Publication Nos. 2007/0003693 and 2008/00572223 which are hereby incorporated by reference.

Referring now to FIG. 23, a flow chart illustrating the method of manufacturing the hybrid air foil bearing of FIGS. 12A-12C in accordance with another embodiment of the present invention is shown. One or more top foils (e.g., three), and a L-shaped orifice tube, a bump foil and a third layer or foil for each top foil are provided in block 1902. If desired, one or more recessed areas can be formed on the inner surface of each top foil in the optional step in block 1304. If desired, a low friction coating can be applied on the interior of the top foil in the optional step in block 1106. A housing having an open slot in the housing to receive each orifice tube is provided in block 1504. One or more top foil assemblies are created in block 2304 by: (a) creating a hole through the top foil to form a top foil orifice holes; (b) creating a hole through the bump foil and the third foil or layer to allow passage of the L-shaped orifice tube; and (c) attaching the curved end of an orifice tube to each top foil orifice hole on the outer portion of the top foil through the bump foil and third foil or layer. Each top foil assembly is formed into a substantially semi-circular shape in block 1308. Each top foil assembly is then inserted into the housing such the orifice tubes extend through the housing slots in block 1508.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

REFERENCES

[1] DellaCorte, C., and Edmonds, B. J., 1995, "Preliminary Evaluation of PS300: A New Self-Lubricating High Temperature Composite Coating for use to 800° C.," NASA Technical Report, NASA, Cleveland, Ohio, NASA TM-107056.

[2] DellaCorte, C., Lukaszewicz, V., Valco, M. J., Radil, K. C., and Heshmat, H., 2000, "Performance and Durability of High Temperature Foil Air Bearings for Oil-Free Turbomachinery," NASA Technical Report, TM-2000-209187/ARL-TR-2202.

[3] Stanford, M. K., Yanke, A. M., and DellaCorte, C., 2004, "Thermal Effects on a Low Cr Modification of PS304 Solid Lubricant Coating," NASA technical Report, NASA, Cleveland, Ohio, NASA TM-2003-213111.

[4] Mohawk Innovative Technology, 2005, "Low-Friction, Wear-Resistant Korolon™ C36 Coatings for High-Temperature, High-Speed, Air Foil Bearings," Mohawk Innovative Technology Internal Newsletter, 23.

[5] Lubell, D., DellaCorte, C., and Stanford, M., 2006, "Test Evolution and Oil-Free Engine Experience of a High Temperature Foil Air Bearing Coating," Proceedings of the ASME Turbo Expo 2006, Power for Land, Sea and Air, Barcelona, Spain, May 8-11, ASME Paper No GT2006-90572.

[6] Heshmat, H., 2006, "Evaluation of Coatings for a Large Hybrid Foil/Magnetic Bearing," International Joint Tribology Conference, San Antonio, Tex., ASME Paper No. UTC2006-12328.

[7] Lund, J. W., 1964, "The Hydrostatic Gas Journal Bearing with Journal Rotation and Vibration," ASME J. of Basic Engineering, 86, pp. 328-336.

[8] Lund, J. W., 1967, "A Theoretical Analysis of Whirl Instability and Pneumatic Hammer for a Rigid Rotor in Pressurized Gas Journal Bearings," Journal of Lubrication Technology, 89, pp. 154-166.

[9] Mori, H., and Miyamatsu, Y., 1969, "Theoretical Flow-Models for Externally Pressurized Gas Bearings," ASME J. Lubr. Technol., 91, pp. 183-193.

[10] Curwen, P. W., Frost, A., and Lund, J. W., 1969, "High-Performance Turboalternator and Associated Hardware. 2—Design of Gas Bearings,", NASA Report no. NASA-CR-1291.

[11] Han, D. C., Park, S. S., and Kim, W. J., 1994, "A Study on the Characteristics of Externally Pressurized Gas Bearings," Precision Engineering, 16(3), pp. 164-173.

[12] Osborne, D. A., and San Andres, L., 2006, "Experimental Response of Simple Gas Hybrid Bearings for Oil-Free Turbomachinery," Journal of Engineering for Gas Turbines and Power, 128, pp. 626-633.

[13] Zhu, X., and San Andres, L., 2004, "Rotordynamic Performance of Flexure Pivot Hydrostatic Gas Bearings for Oil-Free Turbomachinery," ASME Turbo Expo 2004, Vienna, Austria, ASME Paper No. GT2004-53621.

[14] San Andres, L., 2006, "Hybrid Flexure Pivot-Tilting Pad Gas Bearings: Analysis and Experimental Validation," Journal of Tribology, 128, pp. 551-558.

[15] Bosley, R. W., and Miller, R. F., 1998, "Hydrostatic Augmentation of a Compliant Foil Hydrodynamic Fluid Film Thrust Bearing," U.S. Pat. No. 5,827,040.

[16] Eshel, A., 1979, "Numerical Solution of the Planar Hydrostatic Foil Bearing," ASME Journal of Lubrication Technology, 101, pp. 86-91.

[17] Heshmat, H., Chen, H. M., and Walton II, J. F., 2000, "On the Performance of Hybrid Foil-Magnetic Bearings," Journal of Engineering for Gas Turbine and Power, 122(1), pp. 73 (9 pages).

[18] Swanson, E. E., and Heshmat, H., 2002, "Oil-Free Foil Bearings as a Reliable, High Performance Backup Bearing for Active Magnetic Bearings," ASME Turbo Expo 2002: Power for Land, Sea, and Air, Amsterdam, The Netherlands, June 3-6, GT2002-30291.

[19] Swanson, E. E., Heshmat, H., and Walton, J., 2002, "Performance of a Foil-Magnetic Hybrid Bearing," Journal of Engineering for Gas Turbine and Power, 124(2), pp. 375 (8 pages).

[20] Palazzolo, A., Tucker, R., Kenny, A., Kang, K. D., Ghandi, V., Liu, J., Choi, H., and Provenza, A., 2008, "High Temperature, Permanent Magnet Biased, Fault Tolerant, Homopolar Magnetic Bearing Development," ASME Turbo Expo 2008: Power for Land, Sea, and Air, Berlin, Germany, June 9-13, GT2008-50917.

[21] Kim, D., and Park, S., 2009, "Hydrostatic Air Foil Bearings: Analytical and Experimental Investigations," Tribology International, 42, pp. 413-425.

[22] Kumar, M., and Kim, D., 2008, "Parametric Studies on Dynamic Performance of Hybrid Air Foil Bearings," Journal of Engineering for Gas Turbines and Power, 130, pp. 062501-1-062501-7.

[23] Kumar, M., and Kim, D., 2009, "Static Performance of Hydrostatic Air Bump Foil Bearing," Elsevier Tribology International, doi:10.1016/j.triboint.2009.10.015.

[24] Bliss, E. J., and Brown, J. R., 2007, "Experimental Investigation of Foil Bearing Stiffness and Damping Characteristics," Proceedings of 32nd Dayton-Cincinnati Aerospace Science Symposium.

[25] Kim, D., 2007, "Parametric Studies on Static and Dynamic Performance of Air Foil Bearings with Different Top Foil Geometries and Bump Stiffness Distributions," Journal of Tribology, 129, pp. 354-364.

[26] Sim, K., and Kim, D., 2007, "Design of Flexure Pivot Tilting Pads Gas Bearings for High-Speed Oil-Free Microturbomachinery," Journal of Tribology, 129, pp. 112-119.

[27] Song, J., and Kim, D., 2007, "Foil Gas Bearing with Compression Springs: Analyses and Experiments," Journal of Tribology, 129, pp. 628-639.

[28] Kim, D., Rimpel, A. M., Chang, S. S., and Kim, J. H., 2009, "Design and Manufacturing of Meso Scale Tilting Pad Gas Bearings for 100-200 W Class PowerMEMS Applications," Journal of Engineering for Gas Turbines and Power, 131(3), pp. 042503.1-042503.11.

[29] Rimpel, A. M., and Kim, D., 2009, "Rotordynamic Performance of Flexure Pivot Tilting Pad Gas Bearings with Vibration Damper," ASME Journal of Tribology, 131(2), pp. 021101.1-021101.12.

What is claimed is:

1. An air foil bearing for supporting a shaft by an air layer formed between a substantially circular inner surface of a housing and the shaft, the air foil bearing comprising:
a top foil formed into a substantially circular shape having one or more sets of top foil orifice holes, wherein each set of top foil orifice holes comprise at least three top foil orifice holes along a circumference of the circular-shaped top foil;
an orifice tube for each set of top foil orifice holes, wherein the orifice tube comprises (a) a flat side having a set of tube orifice holes such that each tube orifice hole is substantially aligned with one of the top foil orifice holes when the flat side of the orifice tube is connected to an outer surface of the top foil, (b) a closed end, (c) an open end, and (d) a bend proximate to the open end;
a bump foil strip attached to the outer surface of the top foil adjacent to each side of each orifice tube; and
an opening extending through the housing to receive the open end of each orifice tube.

2. The air foil bearing as recited in claim 1, wherein the housing further comprises:
a circumferential groove formed on the inner surface to receive each orifice tube; and
the housing openings extend into the circumferential groove.

3. The air foil bearing as recited in claim 1, wherein the top foil comprises three or more top foil sections.

4. The air foil bearing as recited in claim 1, further comprising a recessed area in an inner surface of the top foil such that one or more of the top foil orifice holes are disposed within the recessed area.

5. The air foil bearing as recited in claim 4, wherein the recessed area is rectangular, circular, elliptical, polygonal or other geometric shape.

6. The air foil bearing as recited in claim 1, further comprising a hydrostatic air supply line connected to the orifice tube.

7. The air foil bearing as recited in claim 1, wherein the orifice tube has a rectangular, triangular or polygonal cross section.

8. The air foil bearing as recited in claim 1, wherein:
the top foil and the bump foil strip comprise a nickel-based alloy; and
the orifice tube comprises stainless steel or a high temperature material.

9. The air foil bearing as recited in claim 1, further comprising a low friction coating on an inner surface of the top foil.

10. A method of manufacturing an air foil bearing comprising the steps of:
providing one or more the orifice tubes wherein each orifice tube has a flat side, a closed end, an open end, and a bend proximate to the open end;
providing a top foil;
providing a housing having an opening extending through the housing to receive the open end of each orifice tube;
providing a foil-tube assembly by attaching the flat side of the orifice tube(s) to an outer surface of the top foil, drilling or machining a set of holes through the inner surface of the top foil and the flat side of the orifice tube to form a set of top foil orifice holes and corresponding orifice tube holes, and attaching a bump foil strip to the outer surface of the top foil adjacent to each side of each orifice tube;

forming the foil-tube assembly into a substantially circular shape; and inserting the foil-tube assembly into the housing such that the open end of the orifice tubes extends through the housing openings.

11. The method as recited in claim 10, wherein a circumferential groove is formed on an inner surface of the housing to receive each orifice tube.

12. The method as recited in claim 10, further comprising the step of applying a low friction coating to an inner surface of the top foil.

13. The method as recited in claim 10, wherein the top foil comprises three or more top foil sections.

14. The method as recited in claim 10, further comprising the step of forming one or more recessed areas in an inner surface of the top foil such that one or more of the top foil orifice holes are disposed within the recessed area.

15. The method as recited in claim 14, wherein the recessed area is rectangular, circular, elliptical, polygonal or other geometric shape.

16. The method as recited in claim 10, wherein the orifice tube has a rectangular, triangular or polygonal cross section.

17. The method as recited in claim 10, wherein:
the top foil and the bump foil strip comprise a nickel-based alloy; and
the orifice tube comprises stainless steel or a high temperature material.

18. An air foil bearing for supporting a shaft by an air layer formed between a substantially circular inner surface of a housing and the shaft, the air foil bearing comprising:
a top foil comprising three or more top foil sections formed into a substantially circular shape having one or more sets of top foil orifice holes, wherein each set of top foil orifice holes comprise at least three top foil orifice holes along a circumference of the circular-shaped top foil;
an orifice tube for each set of top foil orifice holes, wherein the orifice tube comprises (a) a flat side having a set of tube orifice holes such that each tube orifice hole is substantially aligned with one of the top foil orifice holes when the flat side of the orifice tube is connected to an outer surface of the top foil sections, (b) a closed end, (c) an open end, and (d) a bend proximate to the open end;
a bump foil strip attached to the outer surface of the top foil sections adjacent to each side of each orifice tube; and
a circumferential groove formed on the inner surface of the housing to receive each orifice tube and an opening extending through the housing into the circumferential groove to receive the open end of each orifice tube.

19. The air foil bearing as recited in claim 18, further comprising a recessed area in an inner surface of the top foil sections such that one or more of the top foil orifice holes are disposed within the recessed area.

20. An air foil bearing for supporting a shaft by an air layer formed between an inner surface of a housing and the shaft, the air foil bearing comprising:
the inner surface of the housing having a curved polygonal cross-sectional shape with an odd number of curved sides and each curved side having a specified radius;
a top foil key slot formed in the inner surface of the housing approximately at each corner of the curved sides;
an opening formed in the inner surface of the housing approximately at each midpoint of the curved sides;
a bump foil key slot formed in the inner surface of the housing proximate to each top foil key slot and each opening;
a bump foil fixed at each bump foil key slot and extending along the inner surface of the housing between the bump foil key slot and proximate to either the top foil key slot or the opening;
a top foil fixed at each top foil key slot and extending on top of the bump foils between the top foil key slot and proximate to the adjacent top foil, and wherein each top foil comprises a top foil orifice hole corresponding to the opening proximate to the top foil; and
an orifice tube connected to each top foil at each top foil orifice hole and extending through the corresponding opening formed in the inner surface of the housing.

21. The air foil bearing as recited in claim 20, wherein the curved polygonal cross-sectional shape comprises a curved triangular cross-sectional shape.

22. The air foil bearing as recited in claim 20, wherein the curved polygonal cross-sectional shape comprises a curved pentagonal cross-sectional shape, a curved heptagonal cross-sectional shape, or a curved enneagonal cross-sectional shape.

23. The air foil bearing as recited in claim 20, further comprising a recessed area in an inner surface of each top foil such that the top foil orifice hole is disposed within the recessed area.

24. The air foil bearing as recited in claim 23, wherein the recessed area is rectangular, circular, elliptical, polygonal or other geometric shape.

25. The air foil bearing as recited in claim 23, further comprising a hydrostatic air supply line connected to each orifice tube.

26. The air foil bearing as recited in claim 23, wherein the orifice tube has a circular, elliptical, rectangular, triangular or polygonal cross section.

27. The air foil bearing as recited in claim 23, wherein:
the top foil and the bump foil strip comprise a nickel-based alloy; and
the orifice tube comprises stainless steel or a high temperature material.

28. The air foil bearing as recited in claim 23, further comprising a low friction coating on an inner surface of each top foil.

29. The air foil bearing as recited in claim 23, wherein a feed parameter and a supply pressure Ps for the air foil bearing are determined based on one or more loading conditions and operating speeds for the air foil bearing.

30. The air foil bearing as recited in claim 23, wherein the air foil bearing is disposed within a turbo charger, oil-free turbo compressor/blower, gas turbine, aircraft engine, high-speed engine or weapon system.

31. A method of manufacturing an air foil bearing comprising the steps of:
providing a housing with an inner surface having a curved polygonal cross-sectional shape with an odd number of curved sides and each curved side having a specified radius;
forming a top foil key slot in the inner surface of the housing approximately at each corner of the curved sides;
forming an opening in the inner surface of the housing approximately at each midpoint of the curved sides;
forming a bump foil key slot formed in the inner surface of the housing proximate to each top foil key slot and each opening;

affixing a bump foil at each bump foil key slot such that the bump foil extends along the inner surface of the housing between the bump foil key slot and proximate to either the top foil key slot or the opening;

providing a top foil for each curved side, wherein each top foil comprises a top foil orifice hole positioned to align with the corresponding opening in the inner surface of the housing;

attaching an orifice tube to each top foil at each top foil orifice hole; and inserting each orifice tube through a corresponding opening formed in the inner surface of the housing and affixing each top foil at each top foil key slot such that the top foil extends on top of the bump foils between the top foil key slot and proximate to the adjacent top foil.

32. The method as recited in claim 31, wherein the curved polygonal cross-sectional shape comprises a curved triangular cross-sectional shape.

33. The method as recited in claim 31, wherein the curved polygonal cross-sectional shape comprises a curved pentagonal cross-sectional shape, a curved heptagonal cross-sectional shape, or a curved enneagonal cross-sectional shape.

34. The method as recited in claim 31, further comprising the step of applying a low friction coating to an inner surface of the top foil.

35. The method as recited in claim 31, further comprising the step of forming one or more recessed areas in an inner surface of each top foil such that the top foil orifice hole is disposed within the recessed area.

36. The method as recited in claim 35, wherein the recessed area is circular, elliptical, rectangular, circular, elliptical, polygonal or other geometric shape.

37. The method as recited in claim 31, wherein the orifice tube has a rectangular, triangular or polygonal cross section.

38. The method as recited in claim 31, wherein:
the top foil and the bump foil strip comprise a nickel-based alloy; and
the orifice tube comprises stainless steel or a high temperature material.

* * * * *